United States Patent
Quindt et al.

(10) Patent No.: US 6,832,805 B2
(45) Date of Patent: Dec. 21, 2004

(54) CONVERTIBLE TOP SYSTEM FOR VEHICLE

(75) Inventors: Reinhard Wolfgang Quindt, Novi, MI (US); Frank Neubrand, Novi, MI (US)

(73) Assignee: Wilhelm Karmann GmbH, Osnabruck (DE)

(*) Notice: Subject to any disclaimer, the term of this patent is extended or adjusted under 35 U.S.C. 154(b) by 0 days.

(21) Appl. No.: 10/676,741

(22) Filed: Oct. 1, 2003

(65) Prior Publication Data

US 2004/0066057 A1 Apr. 8, 2004

Related U.S. Application Data

(60) Provisional application No. 60/415,654, filed on Oct. 2, 2002.

(51) Int. Cl.⁷ .................................................. B60J 7/14
(52) U.S. Cl. .......................... 296/107.08; 296/107.16; 296/128; 296/121
(58) Field of Search .......................... 296/107.01, 124, 296/128, 132, 107.08, 107.16, 107.07, 107.17, 107.09, 107.15, 116, 121

(56) References Cited

U.S. PATENT DOCUMENTS

| | | | |
|---|---|---|---|
| 1,622,899 A | 3/1927 | Barnes | 296/107.08 |
| 2,007,873 A | 7/1935 | Paulin | 296/107.08 |
| 2,181,869 A | 12/1939 | Carr | 296/107.2 |
| 2,471,378 A | 5/1949 | Shilala | 296/107.08 |
| 2,741,503 A | 4/1956 | Thompson | 292/251 |
| 2,782,070 A | 2/1957 | Chaban | |
| 2,845,299 A | 7/1958 | Pickering | 296/136.06 |
| 2,852,292 A | 9/1958 | Galla | 292/25 |
| 2,939,742 A | 6/1960 | Dardarian | 296/108 |
| 2,959,447 A | 11/1960 | Stebbins | 296/64 |
| 3,035,281 A | 5/1962 | Pearson | 114/361 |
| 3,154,341 A * | 10/1964 | Booth | 296/225 |
| 3,348,876 A | 10/1967 | Pollak | 296/121 |
| 3,425,742 A | 2/1969 | Rauber | 296/121 |
| 3,536,354 A * | 10/1970 | Ingram | 296/147 |

(List continued on next page.)

FOREIGN PATENT DOCUMENTS

| | | |
|---|---|---|
| DE | 44 41 266 C1 | 11/1995 |
| DE | 44 46 483 A1 | 6/1996 |
| EP | 0235616 | 9/1987 |
| JP | 5-169978 | 7/1993 |
| JP | 5-238425 | 9/1993 |

Primary Examiner—Joseph D. Pape
(74) Attorney, Agent, or Firm—Gifford, Krass, Groh, Sprinkle, Anderson & Citkowski, PC

(57) ABSTRACT

A retractable soft top system includes a support frame with a forward end and a rearward end. The rearward end is detachably and pivotably interconnected with the vehicle body at the rear of the passenger compartment. The support frame includes a latching member extending from the forward end. The latching member is operable to selectively engage an engagement feature on the windshield header so as to interconnect the forward end of the support frame with the header. A cover selectively covers a storage area behind the passenger compartment. The cover is pivotally supported such that the forward end moves upwardly to uncover at least a portion of the storage area. The cover has an underside with an engagement feature adjacent the forward end and a retaining latch spaced rearwardly therefrom. The support frame for the retractable soft top has a first position wherein it extends over the passenger compartment with the rearward end interconnected with the vehicle body and the forward end interconnected with the header. The support frame has a second, storage, position, wherein the latching member engages the engagement member on the underside of the cover and the rearward end of the support frame is retained adjacent the underside of the cover by the retaining latch.

19 Claims, 26 Drawing Sheets

U.S. PATENT DOCUMENTS

| | | | |
|---|---|---|---|
| 3,655,238 A | 4/1972 | Stewart | 296/107.15 |
| 4,573,732 A | 3/1986 | Muscat | 296/108 |
| 4,634,171 A | 1/1987 | McKeag et al. | 296/108 |
| 4,720,133 A | 1/1988 | Alexander et al. | 296/117 |
| 4,750,778 A | 6/1988 | Hoban | 296/66 |
| 4,796,943 A | 1/1989 | Fukutomi et al. | 296/65.18 |
| 4,805,956 A | 2/1989 | Saunders | 296/107.17 |
| 4,819,982 A | 4/1989 | Eyb | 296/107.17 |
| 4,984,841 A | 1/1991 | Bauer et al. | 296/97.6 |
| 5,002,330 A | 3/1991 | Koppenstein et al. | 296/107.12 |
| 5,029,932 A | 7/1991 | Parr | 296/108 |
| 5,064,241 A | 11/1991 | Ohrle | 296/121 |
| 5,090,764 A | 2/1992 | Kogawa et al. | 296/107.08 |
| 5,098,148 A | 3/1992 | Hoban | 296/66 |
| 5,100,195 A | 3/1992 | Patel | 296/107.11 |
| 5,106,150 A | 4/1992 | Litwicki | 296/216.02 |
| 5,161,852 A | 11/1992 | Alexander et al. | 296/108 |
| 5,269,582 A | 12/1993 | Muller et al. | 296/135 |
| 5,338,085 A | 8/1994 | Guckel et al. | 296/121 |
| 5,489,134 A | 2/1996 | Furuki et al. | 296/76 |
| 5,511,844 A | 4/1996 | Boardman | 296/107.11 |
| 5,520,432 A | 5/1996 | Gmeiner et al. | 296/107.01 |
| 5,839,778 A | 11/1998 | Schaible | 296/224 |
| 6,073,988 A | 6/2000 | Huber et al. | 296/116 |
| 6,102,771 A | 8/2000 | Poznick et al. | 446/465 |
| 6,142,555 A * | 11/2000 | Huber | 296/107.17 |
| 6,257,650 B1 * | 7/2001 | Lee et al. | 296/107.16 |
| 6,296,295 B1 | 10/2001 | Jambor et al. | 296/146.14 |
| 6,318,793 B1 | 11/2001 | Rapin | 296/107.17 |
| 6,334,644 B1 | 1/2002 | Gurtler | 296/108 |
| 6,443,517 B1 | 9/2002 | Just | 296/107.09 |
| 6,454,344 B2 | 9/2002 | Okada | 296/121 |
| 6,508,502 B2 | 1/2003 | Willard | 296/107.07 |
| 6,511,118 B2 | 1/2003 | Liedmeyer | 296/107.17 |
| 6,520,560 B2 | 2/2003 | Schutt | 296/121 |
| 6,527,332 B2 | 3/2003 | Fioravanti | 296/107.17 |
| 6,533,342 B2 | 3/2003 | Auer et al. | 296/76 |
| 6,550,842 B1 | 4/2003 | Halbweiss | 296/107.12 |
| 6,557,921 B2 | 5/2003 | Wezyk | 296/107.07 |
| 6,616,213 B2 | 9/2003 | Koch | 296/107.08 |
| 2003/0052509 A1 | 3/2003 | Halbweiss | 296/107.09 |
| 2003/0146642 A1 | 8/2003 | Mandl | 296/107.12 |

* cited by examiner

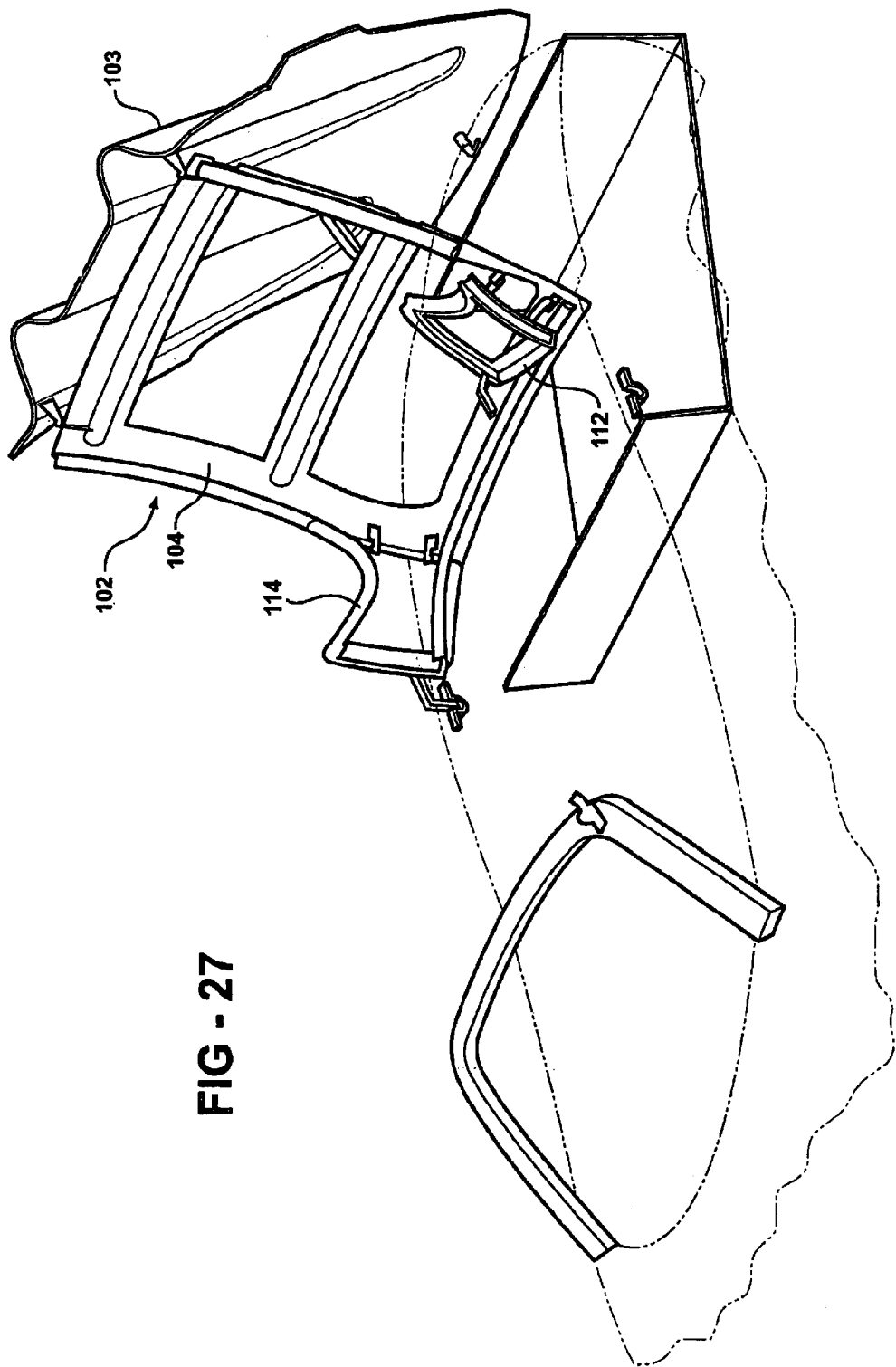

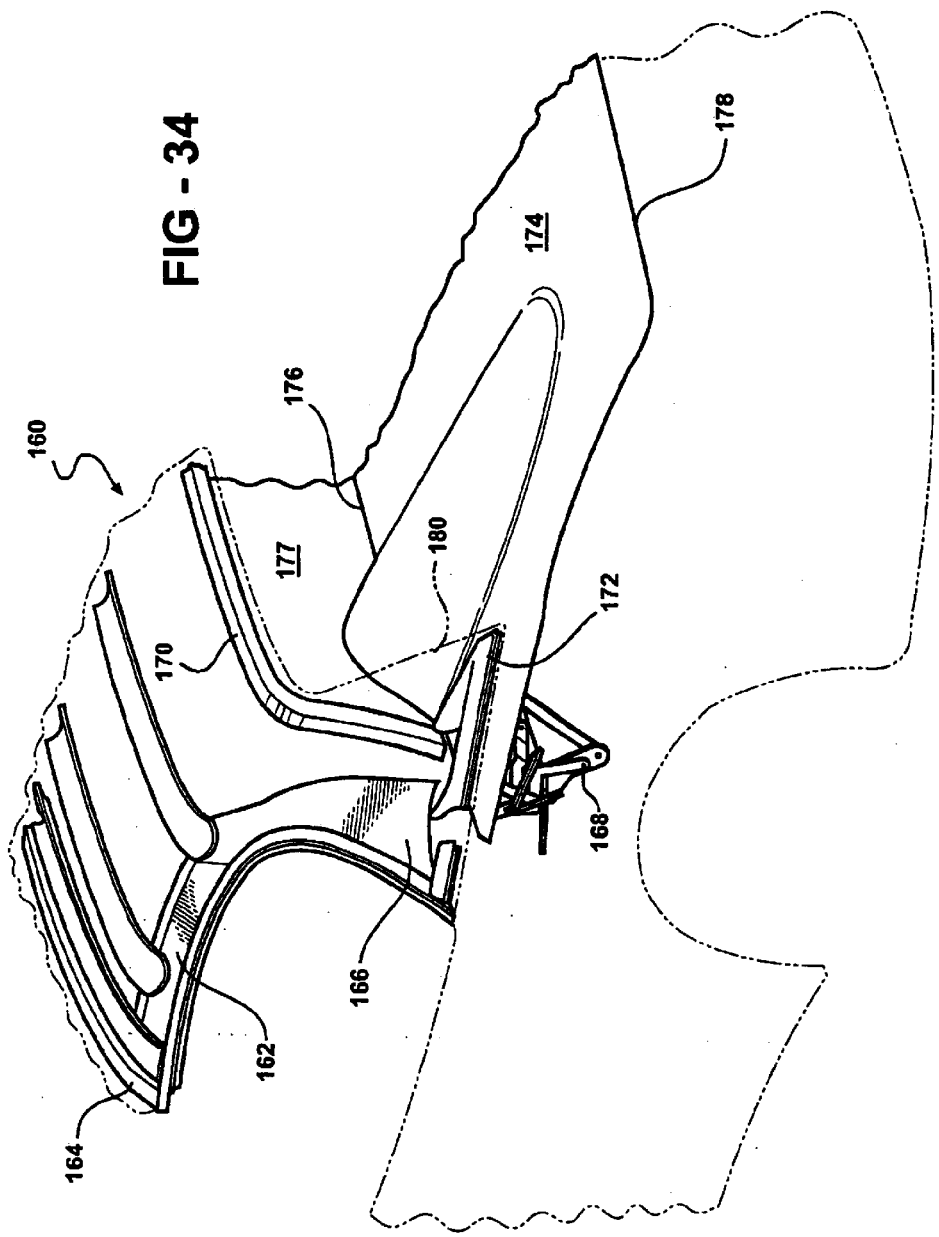

CONVERTIBLE TOP SYSTEM FOR VEHICLE

REFERENCE TO RELATED APPLICATION

This application claims priority from U.S. Provisional Patent Application Ser. No. 60/415,654, filed Oct. 2, 2002, the entire content of which is incorporated herein by reference.

FIELD OF THE INVENTION

The present invention relates generally to retractable roof structures for automobiles and, more specifically, to a top system with reduced complexity.

BACKGROUND OF THE INVENTION

Most vehicles have rigid roof structures that permanently extend over and cover the passenger compartment. Manufacturers also provide a variety of designs that offer the vehicle operator the opportunity to partially or completely uncover the passenger compartment. Sunroofs and moonroofs are some of the simplest designs, and offer the opportunity to open a portion of the vehicle roof for increased airflow. More complicated designs allow the entire roof structure to be retracted and stored behind the passenger compartment.

The most common type of retractable roof design is a convertible soft top or roof. These designs include an articulating structural framework with a flexible cloth or plastic outer skin. In an extended position, the front end of the articulating framework connects to a header above the vehicle windshield and the outer skin extends over the passenger compartment. When retracted, the articulating mechanism, along with the outer skin, fold into a compact shape.

The retracted roof is typically stored in a storage area to the rear of the passenger compartment. In some designs, this storage area is a dedicated storage area forward of a luggage compartment, while in other designs the retracted top consumes part of the luggage space. While it is desirable that the roof package be as compact as possible, there is a general tradeoff between compactness of storage and complexity of design. The designs that store most compactly are also the most complicated and expensive. For some vehicles, it is desirable to have a very simple retractable top design to simplify the vehicle and to reduce cost. In light of this, there is a need for simple, retractable roof designs for certain vehicle applications.

SUMMARY OF THE INVENTION

The present invention provides several designs for simple, retractable, top systems for vehicles. A first embodiment is designed for a vehicle with a passenger compartment and a storage area defined behind the passenger compartment. A windshield defines the forward end of the passenger compartment and has a header in its upper edge, with the header including an engagement feature. The top system has an extended position wherein the top system defines a roof over the passenger compartment and interconnects with the windshield header. The top system also has a storage position wherein the top system does not cover the passenger compartment and at least a portion of the top system is disposed in the storage area. This system has an intermediate position between the extended and storage positions. The top system includes a top with a forward and rearward end, with the rearward end being detachably and pivotally interconnected with the vehicle body adjacent the rear of the passenger compartment. The top includes a latching member at the forward end, with the latching member being operable to selectively engage the engagement feature of the header so as to interconnect the forward end of the top with the header. A cover selectively covers the storage area behind the passenger compartment. The cover has a forward end and a rearward end. The cover has a closed position wherein the cover closes the storage area and an open position wherein the forward end moves upwardly, so as to uncover at least a portion of the storage area. The cover has an underside with an engagement feature and a retaining latch defined thereon. The engagement feature is adjacent the forward end, and the retaining latch is spaced rearwardly therefrom. When the top system is in the extended position, the top extends over the passenger compartment with a rearward end being interconnected with the vehicle body and the latching member being engaged with the engagement feature of the header, so that the forward end is interconnected with the header. When the top system is in the intermediate position, the latching member engages the engagement member of the underside of the cover and the rearward end of the top is retained adjacent the underside of the cover by the retaining latch, such that the top is supported by the cover and is movable therewith. The top system is in the storage position when the top is retained adjacent the underside of the cover and the cover is in the closed position. In some versions, the top includes a top frame and a flexible membrane covers the top frame, when the top is in the extended position. The top frame includes the latching member and the pivotal and detachable interconnection with the vehicle body. The flexible membrane may have a rearward edge that is connected to an upper surface of the cover over the storage area when the top system is in the extended position. Alternatively, the top frame may have a central portion with a forward end and a rearward end, with the forward end being interconnected with the windshield header when the top system is in the extended position. A pair of C-pillar portions are pivotally interconnected with the central portion. The C-pillar portions extend between the central portion and the vehicle body when the top system is in the extended position, and the C-pillar portions fold against the central portion when the top system is in the storage position.

Other versions of the first embodiment include a rear window supported on the vehicle body at the rear of the passenger compartment. The rear window is disposed generally vertically when the top system is in the extended position. In this version the rear window may remain stationary when the top system moves from the extended position to the intermediate position. In another version of this embodiment, the top has an inner-surface and an opposed outer-surface. The inner-surface faces the passenger compartment when the top system is in the extended position and is directly generally downwardly when the top system is in the storage position.

In a second embodiment, the top system includes a top with a central portion with a forward end and a rearward end. The forward end is interconnected with a windshield header when the top system is in the extended position. The top further has a pair of C-pillar portions pivotally interconnected with the central portion. The C-pillar portions extend between the central portion and the vehicle body when the top system is in the extended position and the C-pillar portions fold against the central portion when the top system is in the storage position.

The present invention also provides a method for moving a top system for a vehicle from an extended position, wherein the top system defines a roof over a passenger compartment of the vehicle, to a storage position wherein the top system does not cover the passenger compartment. The method provides a top having a forward end and a rearward end, with the rearward end being detachably and pivotally interconnected with the vehicle body adjacent the rear of the passenger compartment. The forward end is detachably interconnected with the windshield header at the forward end of the passenger compartment. A cover selectively covers the storage area to the rear of the passenger compartment in the vehicle. The cover has a forward end and a rearward end. The cover has a closed position wherein the cover closes the storage area and an open position wherein the forward end moves upwardly so as to uncover at least a portion of the storage area. The method includes the steps of moving the cover from the closed position to the open position and detaching the forward end of the top from the windshield header. The top is pivoted such that the forward end moves upwardly and rearwardly from the windshield header. The forward end of the top is pivotally interconnected with the underside of the cover adjacent the forward end of the cover. The rearward end of the top is detached from the vehicle body and the top is rotated about the forward end such that the rearward end of the top moves rearward until the top is adjacent the underside of the cover. The top is retained adjacent the underside of the cover, and the cover is moved to the closed position such that the top is disposed in the storage area. In a variation of the method, the top has a central portion with a forward end and a rearward end, with the forward end being interconnected with the windshield header when the top system is in the extended position. The top further has a pair of C-pillar portions pivotally interconnected with the central portion, with the C-pillar portions extending between the central portion and the vehicle body when the top system is in the extended position. The method further provides a step of folding the C-pillar portions against the central portion prior to moving the cover to the closed position. In another variation on the method, the cover has a first open position and a second open position wherein the forward end of the cover is farther upward when the cover is in the second open position than when the cover is in the first open position. The step of moving the cover from the closed position to the open position comprises moving the cover to the first open position. The method further provides the step of moving the cover from the first open position to the second open position after the forward end of the top is pivotally interconnected with the underside of the cover, such that the top is lifted upwardly to perform the detaching step.

In another embodiment of the present invention, a retractable top system has a rear window having an upper edge and a pair of side edges. The rear window has a first position, wherein the window is supported on the body at the rear of the passenger compartment in a generally vertical position. The rear window is in the first position when the top system is in the extended position. A support frame has a forward end and a rearward end, with the forward end of the support frame interconnecting with the windshield header when the top system is in the extended position. The rearward end is pivotally interconnected with the vehicle body at the rear of the passenger compartment. The support frame has an inner surface and an opposed outer surface, with the inner surface facing the passenger compartment when the top system is in the extended position. The cover has a forward end and a rearward end, with the cover having a closed position wherein the cover closes the storage area and an open position wherein the forward end moves upwardly so as to uncover at least a portion of the storage area. The cover has an inner surface and an opposed outer surface, with the inner surface facing the storage area when the cover is in the closed position. A flexible roof membrane has a forward edge proximate the forward end of the support frame. The membrane extends rearwardly so as to cover at least the outer surface of the support frame when the top system is in the extended position. The roof membrane further has a pair of rear fin portions, with each fin portion extending rearwardly of the rear window adjacent one of the side edges of the rear window when the top is in the extended position. The fin portions have rearmost edges that are adjacent the outer surface of the cover when the top system is in the extended position and the cover is closed. In some versions, the support frame is a one piece frame that extends between the forward end and the rearward end and does not fold or collapse. The outer surface of the support frame is directed downwardly when the top system is in the storage position. In other versions, the top frame is a two piece frame having a rearward piece and a forward piece that are pivotally interconnected. The forward piece is interconnected with the windshield header when the top system is in the extended position and the rearward piece is pivotally interconnected with the vehicle body. The rearward and forward pieces each have an inner surface and an outer surface, with the inner surface facing the passenger compartment when the top system is in the extended position. The outer surface of the rearward piece is directed downwardly when the top system is in the storage position. The two piece frame may fold such that the inner surfaces of the forward and rearward pieces are directed toward one another when in the storage position. Alternatively, they may fold such that the outer surfaces face one another when in the storage position.

In yet another embodiment of the present invention, a retractable top system includes a support frame assembly having a forward end and a rearward end, with the forward end being interconnected with the windshield header when the top system is in the extended position. A pair of fin supports each has a first end pivotally interconnected with the rearward end of the support frame assembly, and a second end extending therefrom. Each fin support is movable between an extended position, wherein the fin support extends rearwardly from the support frame and a folded position wherein the fin support is pivoted toward the support frame. The cover has a forward edge and a rearward edge. The cover has a closed position wherein the cover closes the storage area, and an open position wherein the forward edge moves upwardly, so as to uncover at least a portion of the storage area. The cover has an inner surface and an opposed outer surface. The inner surface faces the storage area when the cover is in the closed position. The cover has a pair of engagement features defined thereon. When the forward end of the support frame assembly is interconnected with the windshield header, and the cover moves from the open position to the closed position, the engagement features on the cover engage the fin supports and move the fin supports from the folded position to the extended position. The fin supports are adjacent the outer surface of the cover when the cover is closed and the fin supports are in the extended position. Other aspects of the present invention will be clear from the detailed description.

BRIEF DESCRIPTION OF THE DRAWINGS

FIG. 27 is a perspective view of the top system of FIGS. 19–26, with the forward end of the top engaged with the cover and with one of the C-pillars portion folded inwardly;

FIG. 34 is a perspective view of a portion of a top system according to a fifth embodiment of the present invention, with the top system in the extended position;

DETAILED DESCRIPTION OF THE PREFERRED EMBODIMENTS

Figure 1:
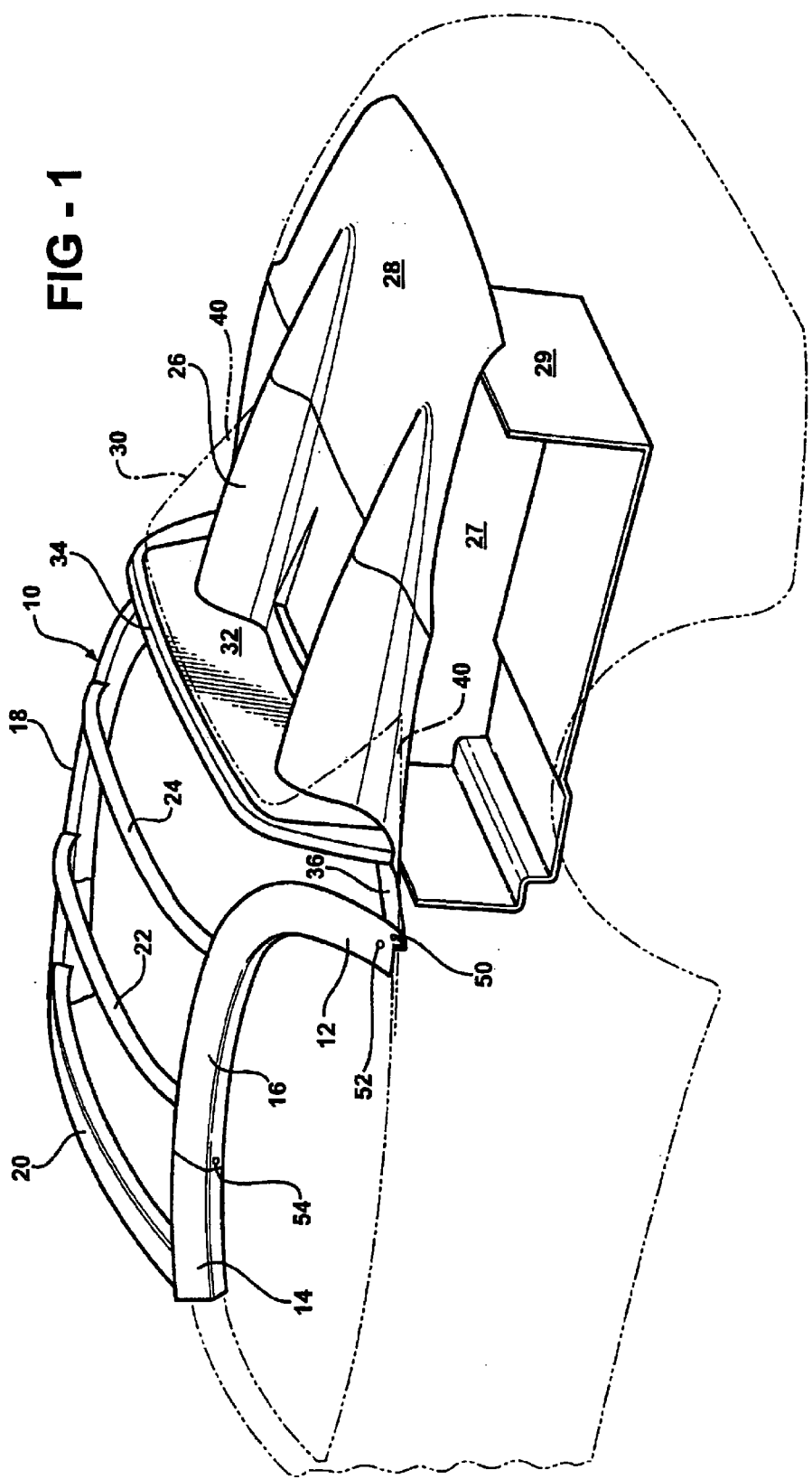
FIG. 1 is a perspective view of a retractable top system according to a first embodiment of the present invention, with the top system in the extended position.

Referring to FIG. 1, a first embodiment of a retractable roof design will be described. FIG. 1 illustrates only portions of the vehicle, with it being understood that additional components would be necessary for a complete vehicle. The first embodiment of the present invention is a retractable top system with a flexible outer covering, such as a cloth or plastic membrane. The flexible outer covering is supported by a top frame or support frame 10, which is shown in an extended position, wherein the top covers the passenger compartment. The support frame 10 has a rear end 12 that is connected to the vehicle body at the rear of the passenger compartment, and a forward end 14 that, in the extended position, interconnects with the header of the windshield, not shown. The support frame 10 includes a pair of side members 16 and 18 that run between the forward end 14 and rearward end 12. A plurality of bows extend side-to-side between the side members 16 and 18. A front bow 20 defines the forward end 14 of the frame 10. Two additional bows 22 and 24 extend side-to-side between the side members 16 and 18, and are spaced behind the front bow 20. As will be discussed more herein below, the support frame 10 is partially collapsible so as to reduce its overall length when it is stored in the storage compartment. For this purpose, the side members 16 and 18 are foldable at a joint just forward of the second bow 22.

FIG. 1 also illustrates a storage area cover 26 that is positioned rearwardly of the passenger compartment and covers a storage area 27. The general shape of the storage compartment 27 is shown by a partially illustrated storage compartment floor and walls 29. A decklid 28 also provides access to the storage area 27. Alternatively, the storage area may be divided into an area dedicated to top storage and an area dedicated to luggage storage. The storage area cover 26 may alternatively be referred to as a tonneau cover.

As shown, the side members 16 and 18 are approximately J-shaped such that they extend upwardly and then forwardly from the rear end 12. The flexible top covering is not illustrated in FIG. 1, though its rearmost edge is shown at 30. Preferably, the top covering attaches at its forward end to the front bow 20 and extends rearwardly over bows 22 and 24, and then stretches rearwardly to the rear edge 30. A rear window or backlight is shown extending generally vertically upwardly from the body of the vehicle at 32. The rear window 32 is surrounded by a rear window frame 34, which is supported in an articulated manner by a pair of support links, one of which is shown at 36. The support links extend forwardly from the window frame 34 to a position near the rear end 12 of the support frame 10. The window frame 34 also serves as the rearmost bow of the support frame assembly, which includes the support frame 10 and the frame 34. As shown, the rear edge 30 of the flexible covering for the top is shaped so as to allow a view through the rear window 32, but has side portions that extend rearwardly in the form of flying buttresses or fins 40.

Figure 2:
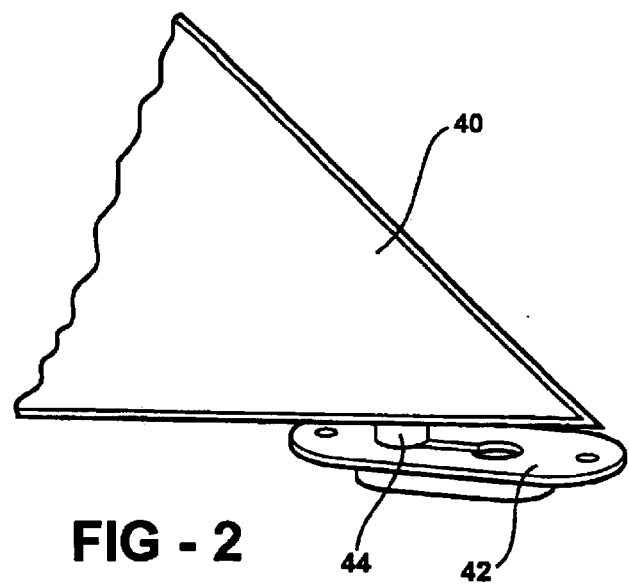
FIG. 2 is a detailed view showing an interconnection between a fin portion of a flexible membrane for the top system and the storage area cover for the embodiment of FIG. 1.
Figure 3:
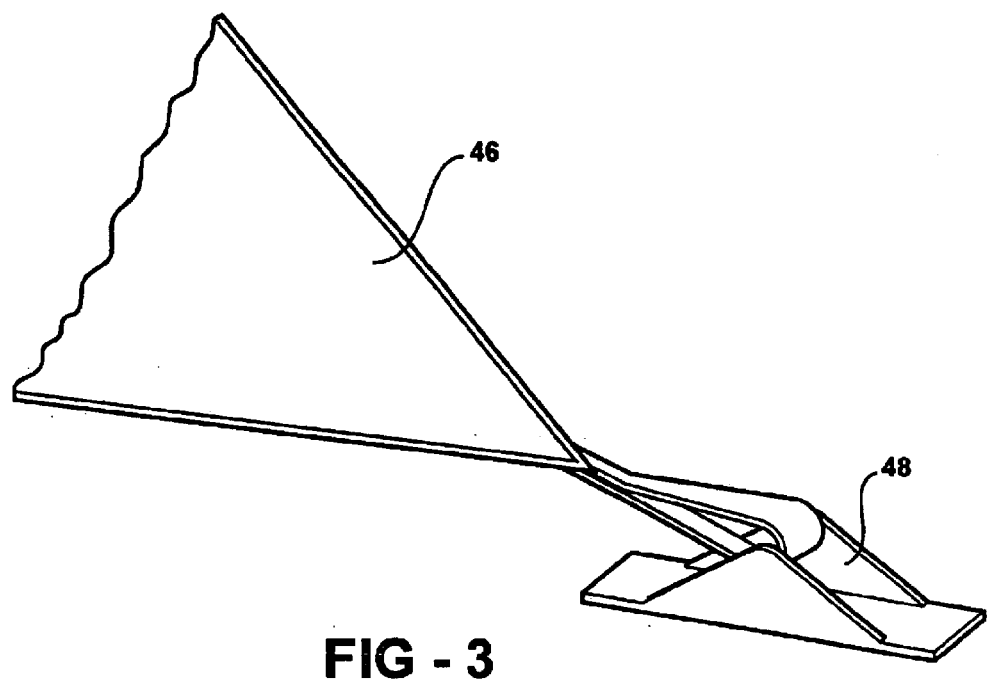
FIG. 3 is a detailed view similar to FIG. 2, showing an alternative interconnection approach.

Referring now to FIG. 2, one of the side portions 40 of the flexible covering for the top is shown in detail. The side portion 40 is generally triangular-shaped, and is attached at its trailing edge either to the storage area cover or to the vehicle body beside the cover. An attachment device 42 is shown in FIG. 2, which would be part of the storage area cover or vehicle body. The attachment device 42 has a slot that is engaged by engagement tab 44 on the side portion 40 of the vehicle top. In use, the side portions extend rearwardly from the remainder of the top and engage attachment devices on the storage area cover or body, which help to tension the top into place. The illustrated attachment device requires the attachment tab 44 to be positioned in the slot and then slid forwardly. Other approaches are also possible. For example, FIG. 3 illustrates an alternative attachment between a side portion 46 and an attachment device 48. According to one approach, the vehicle top is attached at its trailing edges to the attachment devices on the storage area cover or body, and then the front end 14 of the top frame 10 is secured to the header. This stretches the top material. Alternatively, some type of tensioning device may be provided on the trailing edge, such as part of the storage area cover, the body or the attachment device.

Figure 4:
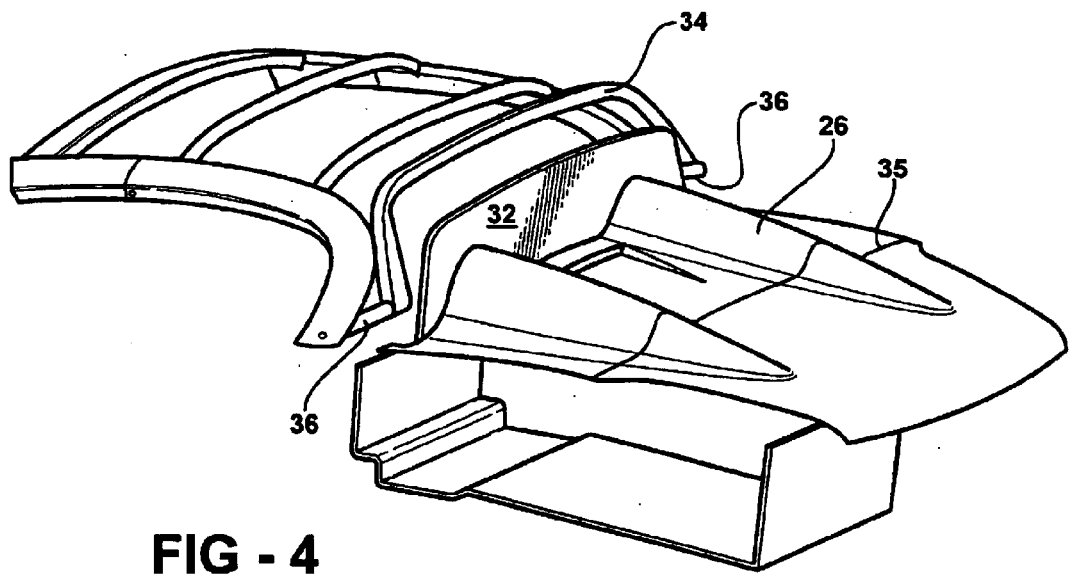
FIG. 4 is a perspective view of the top system of FIG. 1, with the rearmost bow and backlight frame tilted forwardly to allow the storage area cover to open.
Figure 5:
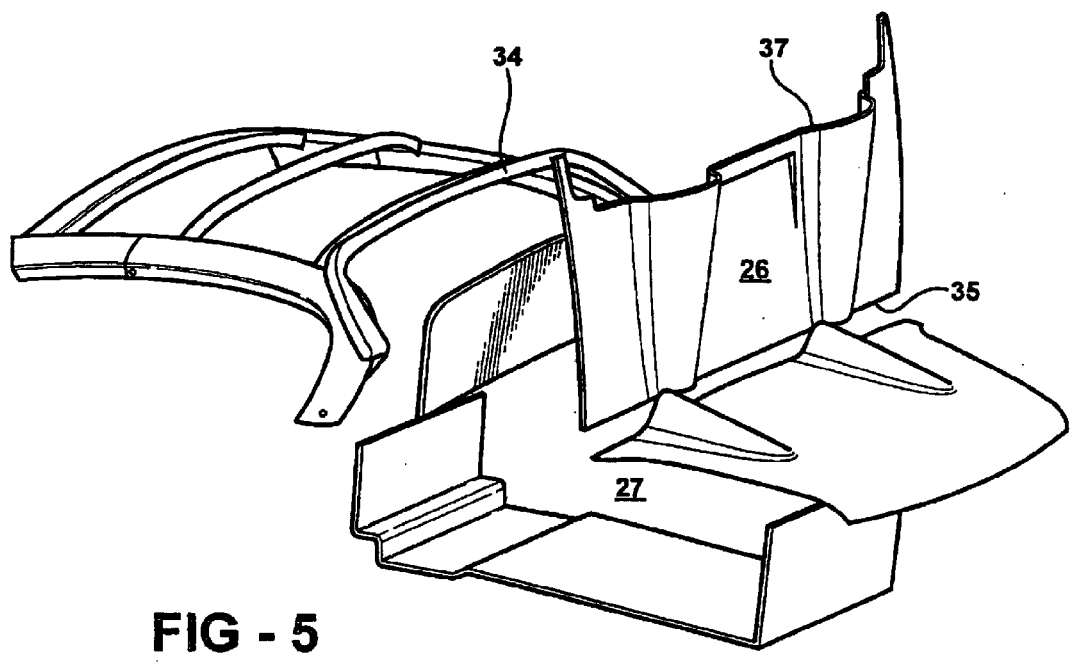
FIG. 5 is a perspective view similar to FIG. 4, with the cover opened.

Referring now to FIGS. 4–9, the retraction and storing of the top system will be described. As a first step, the forward end of the top is released from the windshield header, and the fin portions of the flexible membrane or covering for the top are detached or released from the storage area cover. While the figures show only the support frame for the top, in most embodiments the flexible covering remains on the support frame, but has been left out of the figures for clarity. As shown in FIG. 4, once the covering material has been released from the storage area cover, the rearmost bow and rear window frame 34 is folded forwardly along with the links 36. This moves the frame 34 out of the way of the storage area cover 26, which is pivotally supported at its rearward edge 35. In the illustrated embodiment, the rear window 32 remains in position, though in alternative versions it may retract, be removed, or fold at this stage or later in the process. FIG. 5 illustrates the next step, wherein the window frame 34 is folded against the remainder of the support frame assembly, and the storage area cover 26 has been folded into a generally vertical position, thereby uncovering an opening to the storage area 27. The storage area cover 26 may be said to have a forward edge 37 which moves upwardly and rearwardly as the cover 26 moves from the closed position to the open position.

Figure 6:
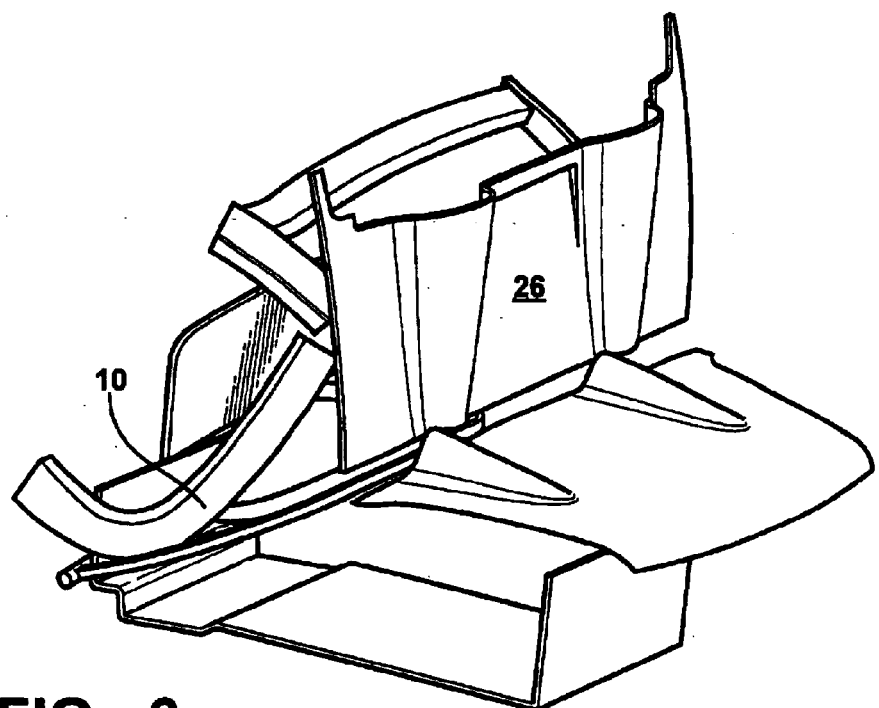
FIG. 6 is a perspective view similar to FIGS. 4 and 5, with the support frame assembly partially retracted through the opening under the cover.

FIG. 6 shows the next step in the operation, wherein the storage area cover 26 remains in its open position and the support frame 10 and window frame assembly are pivoted so as to pivot through the opening uncovered by the storage area cover 26. Referring back to FIG. 1, the pivot points between various portions of the top structure are indicated. A pivot between the support frame 10 and the body is indicated at 50, the pivot between the link 36 and the frame is indicated at 52, and the pivot between the forward section of the support frame 10 and the rearward section of the support frame is shown at 54. It should be noted that each of these pivots is preferably a simple pivot, without the need for any linkages. Referring again to FIG. 6, it can be seen that the support frame 10 has been pivoted rearwardly and the forward section of the support frame pivoted downwardly towards the rearward section so as to shorten its overall length, such that it can pass through the opening into the storage area 27.

Figure 7:
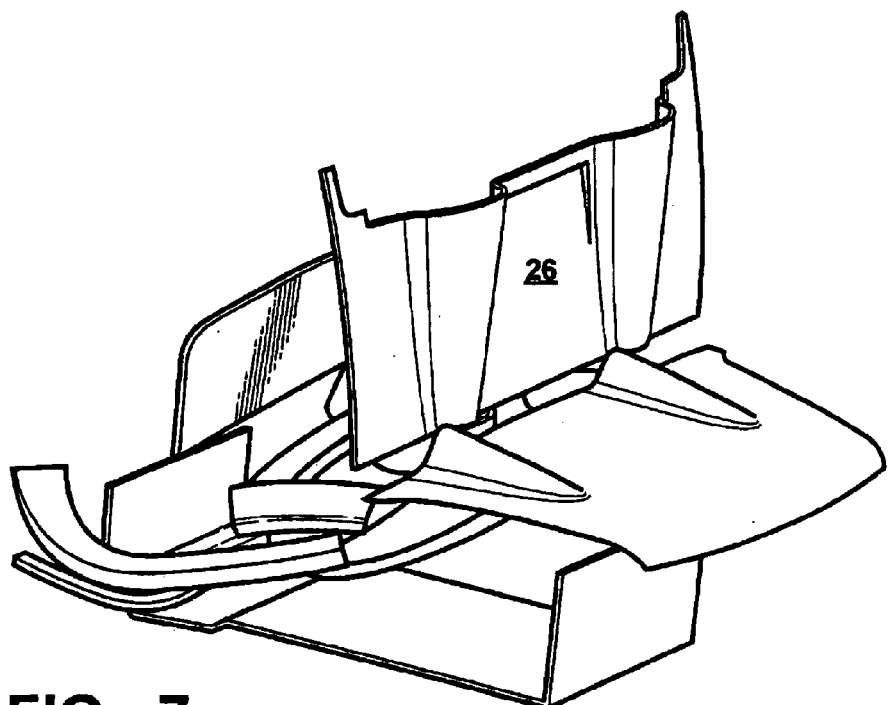
FIG. 7 is a perspective view similar to FIGS. 4–6, with the support frame assembly fully retracted.
Figure 8:
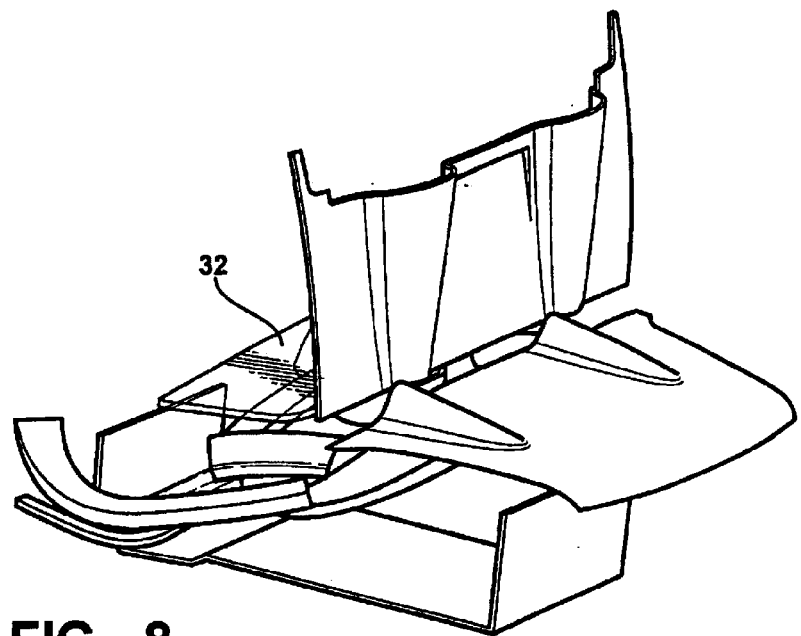
FIG. 8 is a perspective view similar to FIGS. 4–7, showing the rear window tilted rearwardly.
Figure 9:
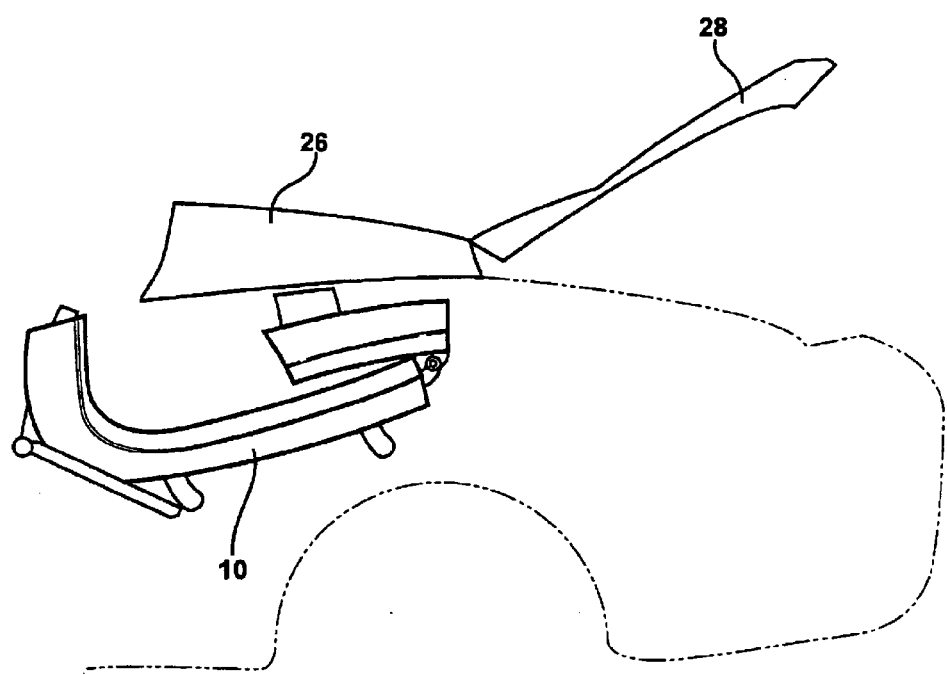
FIG. 9 is a side elevational view of the top of the previous figures, with the top system being fully retracted, and the luggage compartment of the vehicle being open.

FIG. 7 shows the support frame completely stored in the storage area. FIG. 8 again illustrates the support frame in the storage area, and illustrates the rear window 32 being pivoted rearwardly about its lower edge. In some embodiments, the rear window is pivoted downwardly for storage, and in others, it may be left completely or partially upwardly as a wind block, or removed or stowed in other ways. FIG. 9 illustrates a side view of the support frame 10 in the storage area, and the storage area cover 26 pivoted back into its generally horizontal position so that it covers the opening into the storage area 27. FIG. 9 also illustrates that the decklid 28 may be pivoted upwardly about its forward edge so as to allow access to the storage area 27.

As will be clear to those of skill in the art, the first embodiment of the retractable soft-top according to the present invention, may be power actuated, or manually operated. Either way, it provides a simple top design that stores relatively compactly.

Figure 10:
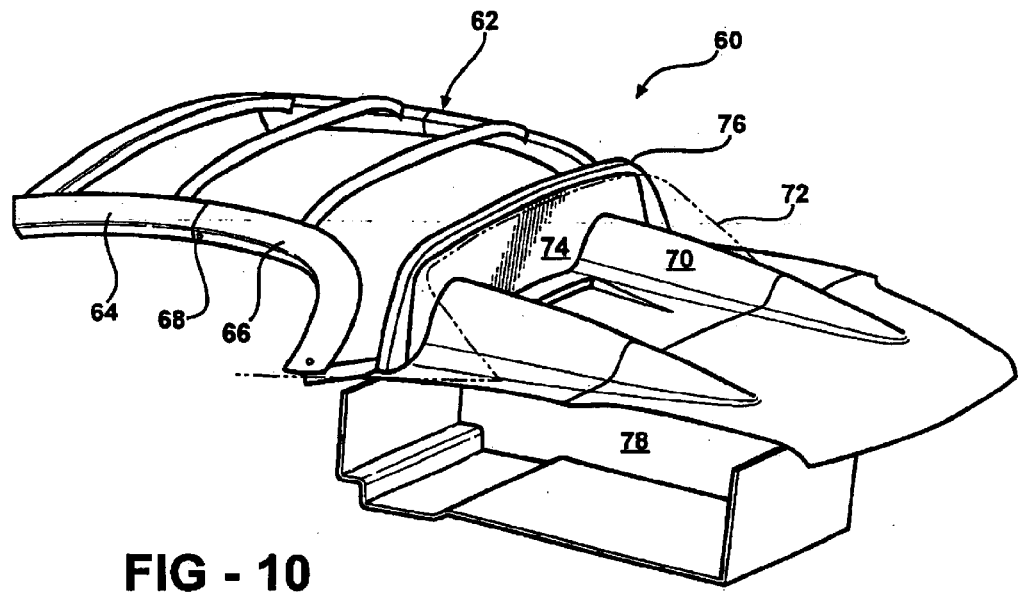
FIG. 10 is a perspective view of a top system according to a second embodiment of the present invention, with the top system in the fully extended position.
Figure 11:
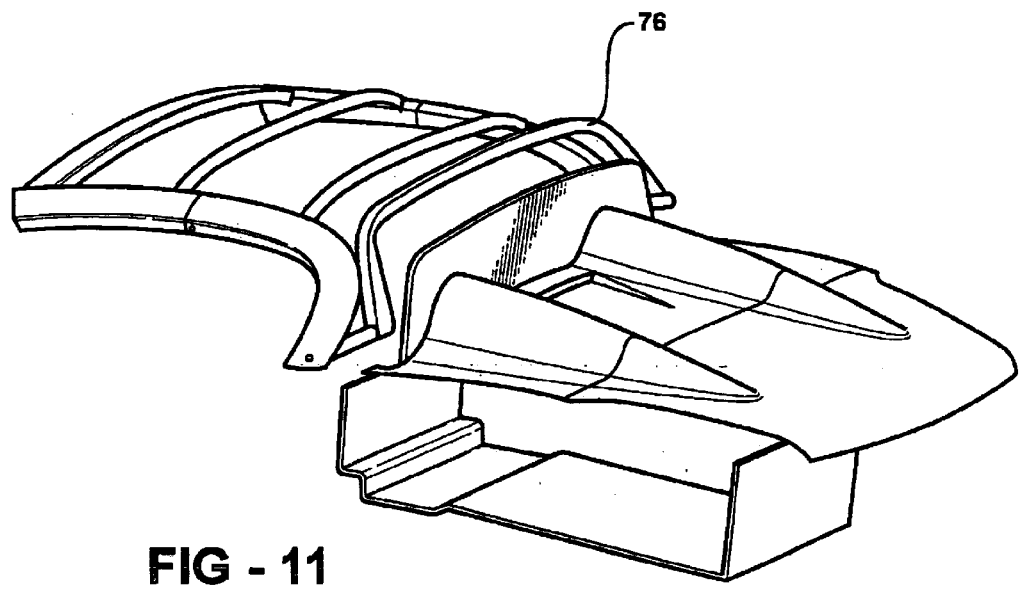
FIG. 11 is a perspective view similar to FIG. 10 with the rearmost bow and backlight frame tilted forwardly to clear the storage area cover.
Figure 12:
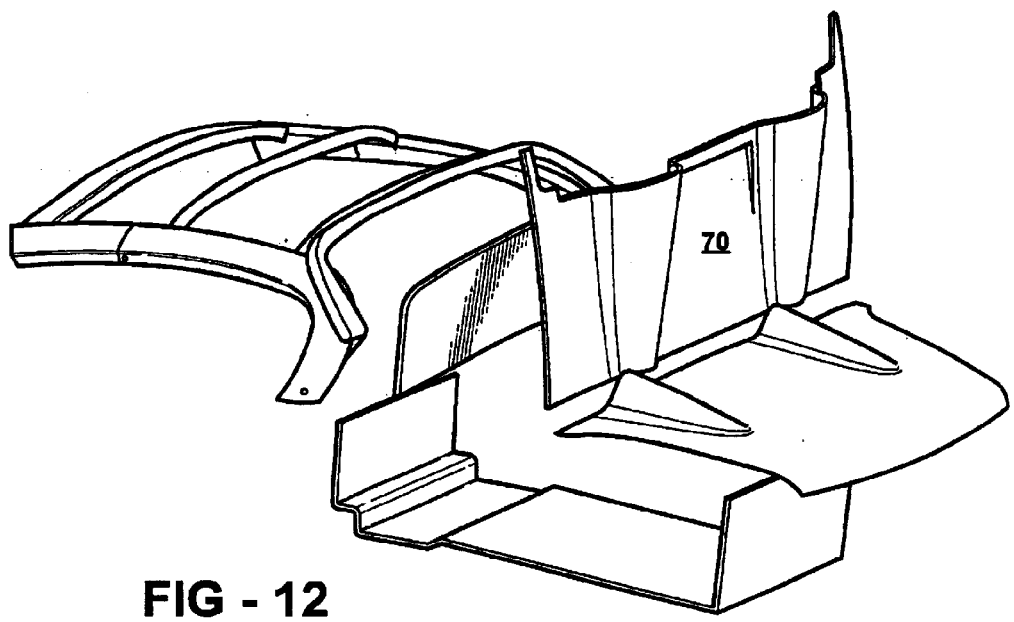
FIG. 12 is a perspective view similar to FIGS. 10 and 11 with the cover shown in an open position.
Figure 13:
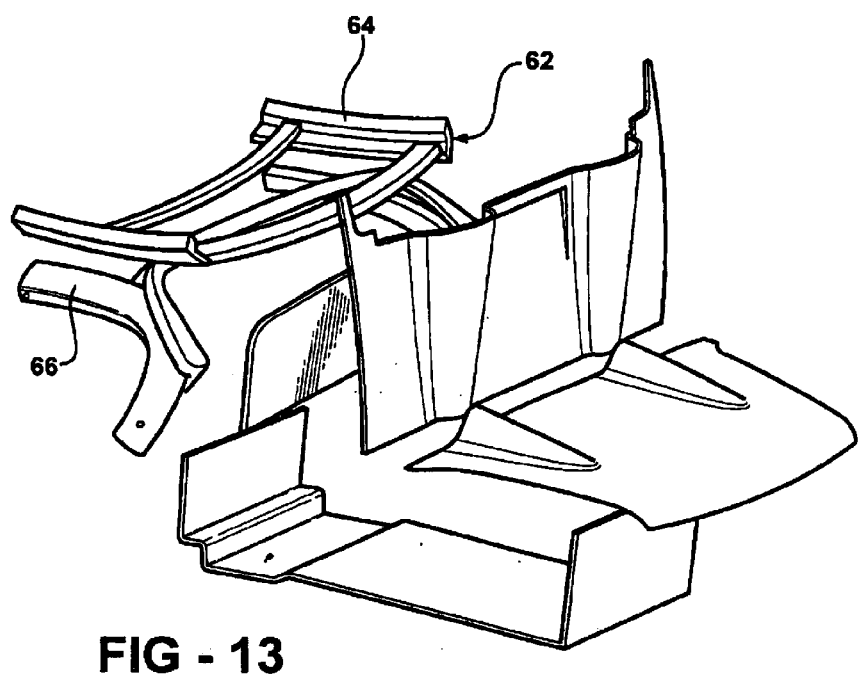
FIG. 13 is a perspective view similar to FIGS. 10–12, with the forward piece of the top frame folded backwardly onto the rearward piece.
Figure 14:
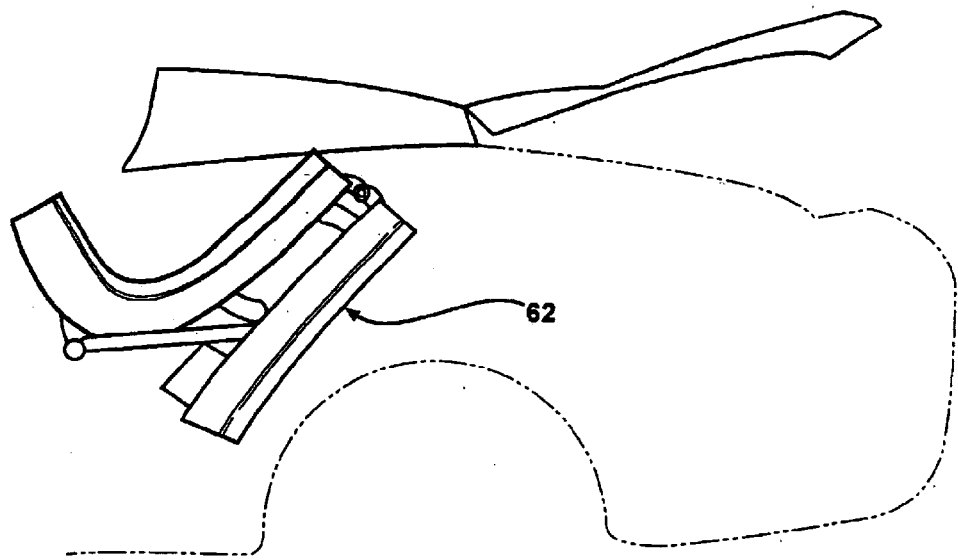
FIG. 14 is a side view of the top system of FIGS. 10–13, with the top fully retracted into the storage area.

Referring now to FIG. 10, a second embodiment of a retractable top system according to the present invention is generally illustrated at 60. This design is similar to the first embodiment, but the point where the support frame 62 folds is moved rearwardly, and the forward section 64 folds upwardly and backwardly onto the rear portion 66, rather than downwardly, as in the previous embodiment. The pivot between the forward section 64 and the rear section 66 is generally shown at 68. This embodiment of the present invention uses the same covering material design, storage area cover design, and attachment design for the interconnection for the covering material and the storage area cover. The storage area cover is indicated at 70, the rear edge of the covering material is indicated at 72, the rear window is indicated at 74, and the rear window frame is indicated at 76. The storage area is indicated at 78. FIG. 11 illustrates the rear window frame 76 being folded upwardly against the remainder of the support frame assembly. FIG. 12 illustrates the storage area cover 70 moved into its generally vertical open position. FIG. 13 illustrates the forward portion 64 of the support frame 62 being folded upwardly and rearwardly onto the rear portion 66. FIG. 14 illustrates the support frame 62 after it has been rotated about its rearward edge into the storage area 78.

Figure 15:
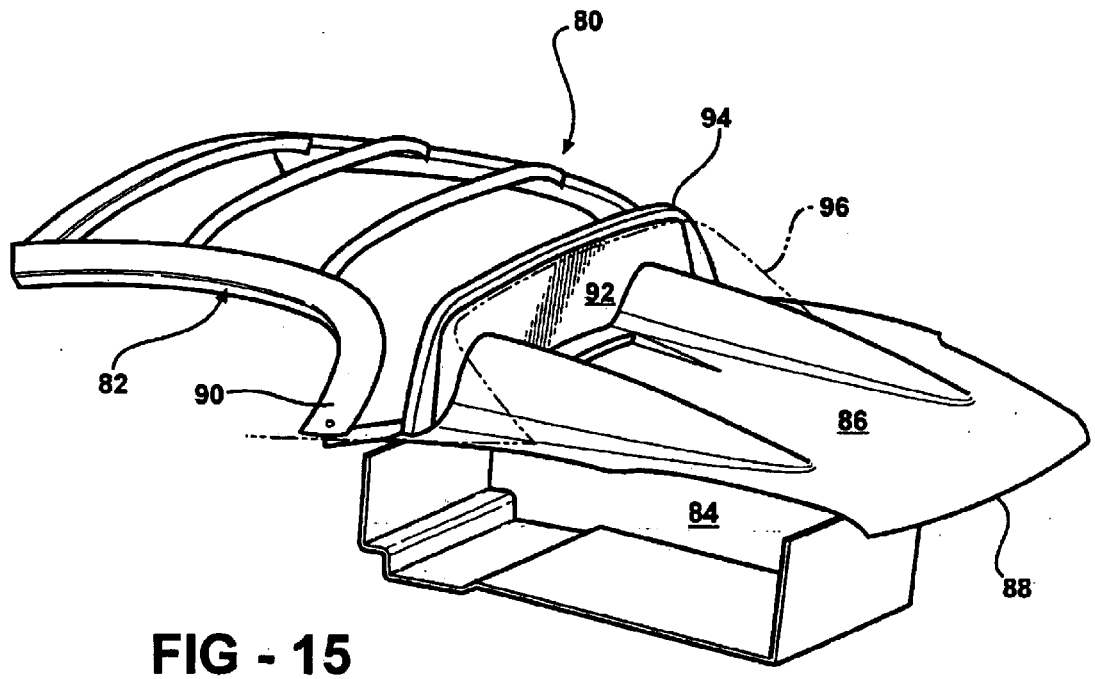
FIG. 15 is a perspective view of a top system according to a third embodiment of the present invention, with the top system in the fully extended position.
Figure 16:
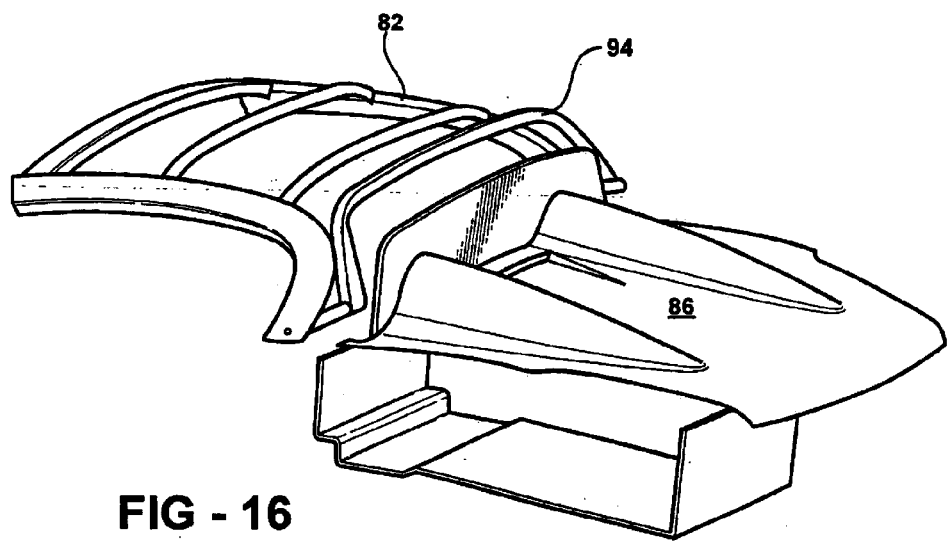
FIG. 16 is a perspective view similar to FIG. 15 with the rearmost bow and backlight frame tilted forwardly to allow the cover to open.
Figure 17:
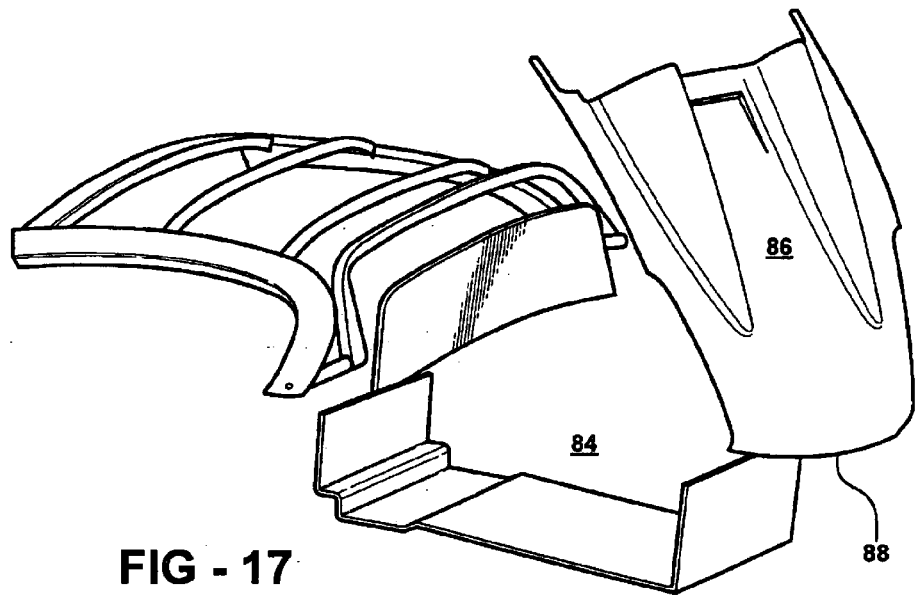
FIG. 17 is a perspective view similar to FIGS. 16 and 17, with the cover shown pivoted rearwardly so as to uncover the storage area for the vehicle top.
Figure 18:
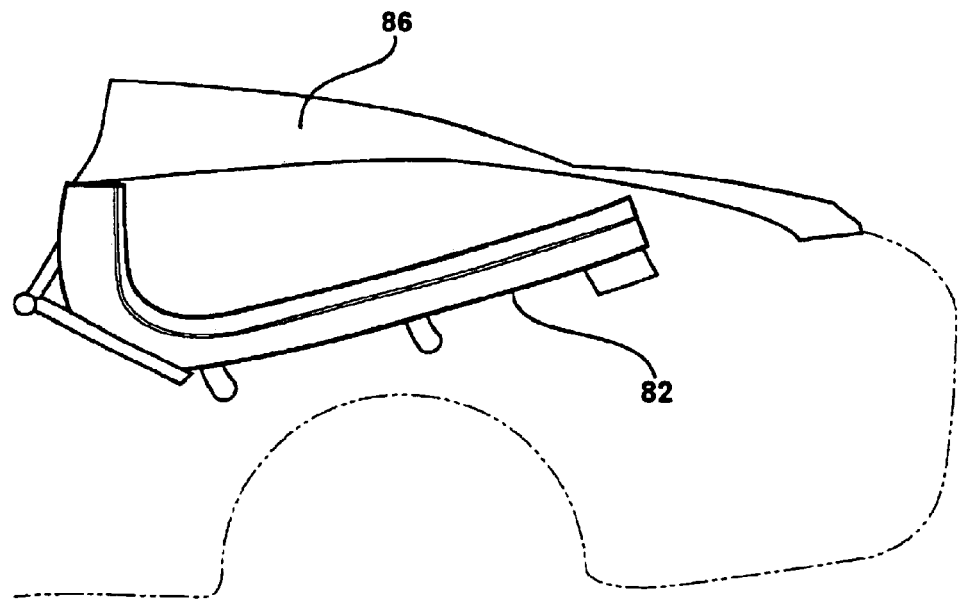
FIG. 18 is a side elevational view of the top system according to the third embodiment, with the top fully retracted into the storage area and the cover closed.
Figure 19:
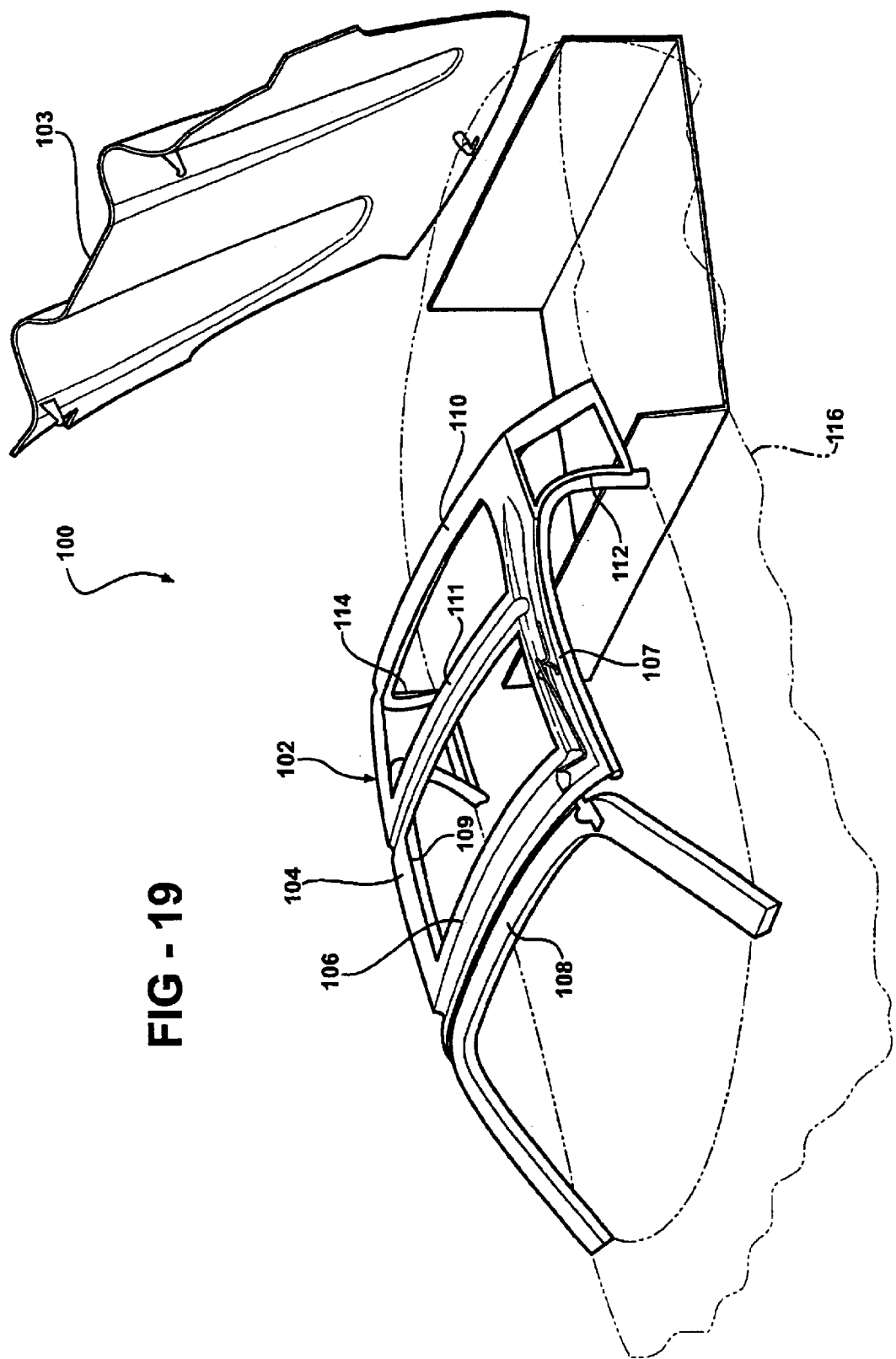
FIG. 19 is a perspective view of a collapsible, removable, and stowable top system design according to a fourth embodiment of the present invention, with the storage area cover shown in an open position.

Referring now to FIG. 15, a third embodiment of a retractable top system according to the present invention is generally shown at 80. The support frame 82 in this embodiment is not foldable or collapsible, but instead remains in its original shape and size during a retraction into the storage area 84. That is, the frame 82 is a one piece frame, unlike the two piece frames in the previous embodiments. The storage area cover 86 in this embodiment is much longer than in the previous embodiment, and extends rearwardly so as to replace the decklid. The storage area cover 86 is pivotally attached to the vehicle body at its rearward edge 88. The support frame 82 is pivotally connected to the body of the vehicle at its rearward end 90. The design of the rear window 92, the rear window frame 94, the flexible membrane 96, and the attachment between the flexible membrane 96 and the storage area cover 86 or body are similar to the first two embodiments of the present invention. FIG. 16 illustrates the window frame 94 being folded forwardly against the support frame 82 so as to allow clearance for the storage area cover 86. FIG. 17 illustrates the storage area cover 86 being opened by pivoting upwardly and rearwardly about its rear edge 88. This provides a much larger opening to the storage area 84. FIG. 19 illustrates the support frame 82 after it has been rotated rearwardly by approximately 180 degrees and is stored in the storage area. The storage area cover 86 is returned to its generally horizontal position.

Referring now to FIG. 19, a fourth embodiment of a retractable vehicle top according to the present invention is generally shown at 100. This design differs substantially from previous designs in that the support frame 102 does not pivot into the storage area, but instead collapses and is stowed in a position against the underside of the storage area cover 103. As with previous embodiments, FIG. 19 illustrates a support frame without the flexible membrane covering. However, it should be understood that a flexible roof membrane similar to that discussed in the previous embodiments is preferably provided. Also preferably, the membrane attaches to the storage area cover 103 or vehicle body in a manner similar to that previously discussed. FIG. 19 shows the storage area cover 103 pivoted upwardly and rearwardly into a generally vertical position. Prior to rotating the storage area cover upwardly, the top covering material would have been detached from the storage area cover or body.

The support frame 102 includes a generally horizontal central portion 104 that extends from a front bow 106 adjacent the windshield header 108 to a rear bow 110 that is positioned generally above the rear window. The central portion 104 has a pair of side members 107 and 109 that extend generally longitudinally between the front bow 106 and rear bow 110. An intermediate bow 111 preferably extends side-to-side between the side members 107 and 109, and generally parallel to the front and rear bows 106 and 110. A pair of C-pillar portions 112 and 114 have upper ends that are pivotally attached to the central portion 104 and lower ends that are pivotally and detachably interconnected with the sides of the vehicle body 116.

Figure 20:
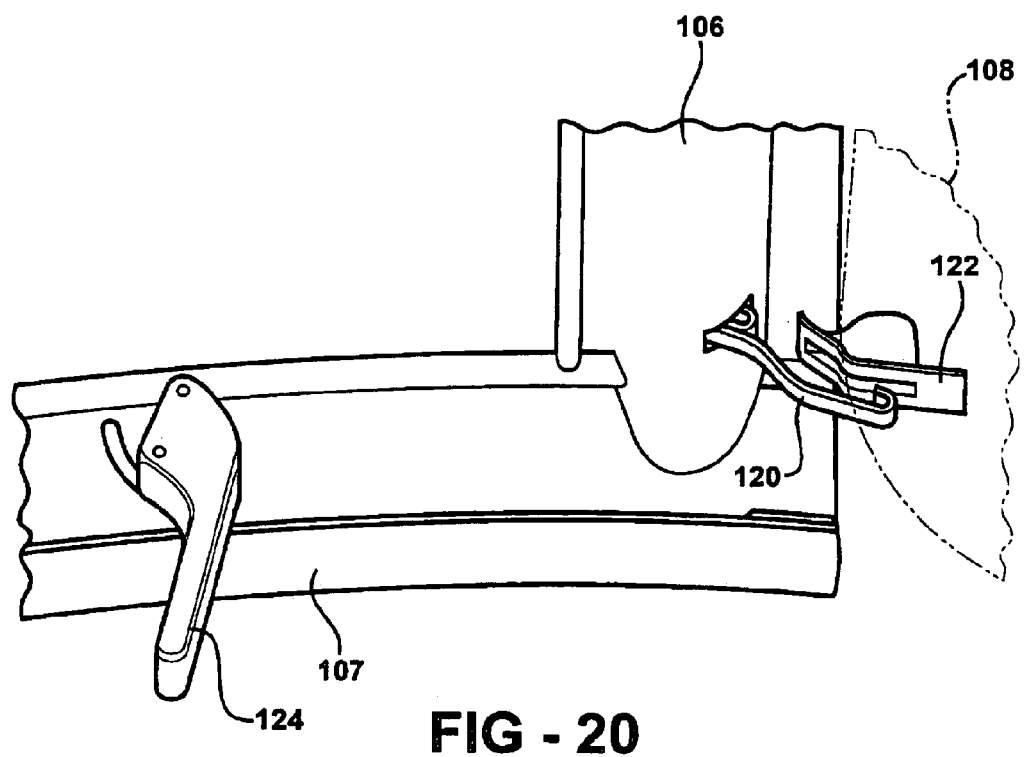
FIG. 20 is a detailed view showing the header latch design for the top system of FIG. 19.
Figure 21:
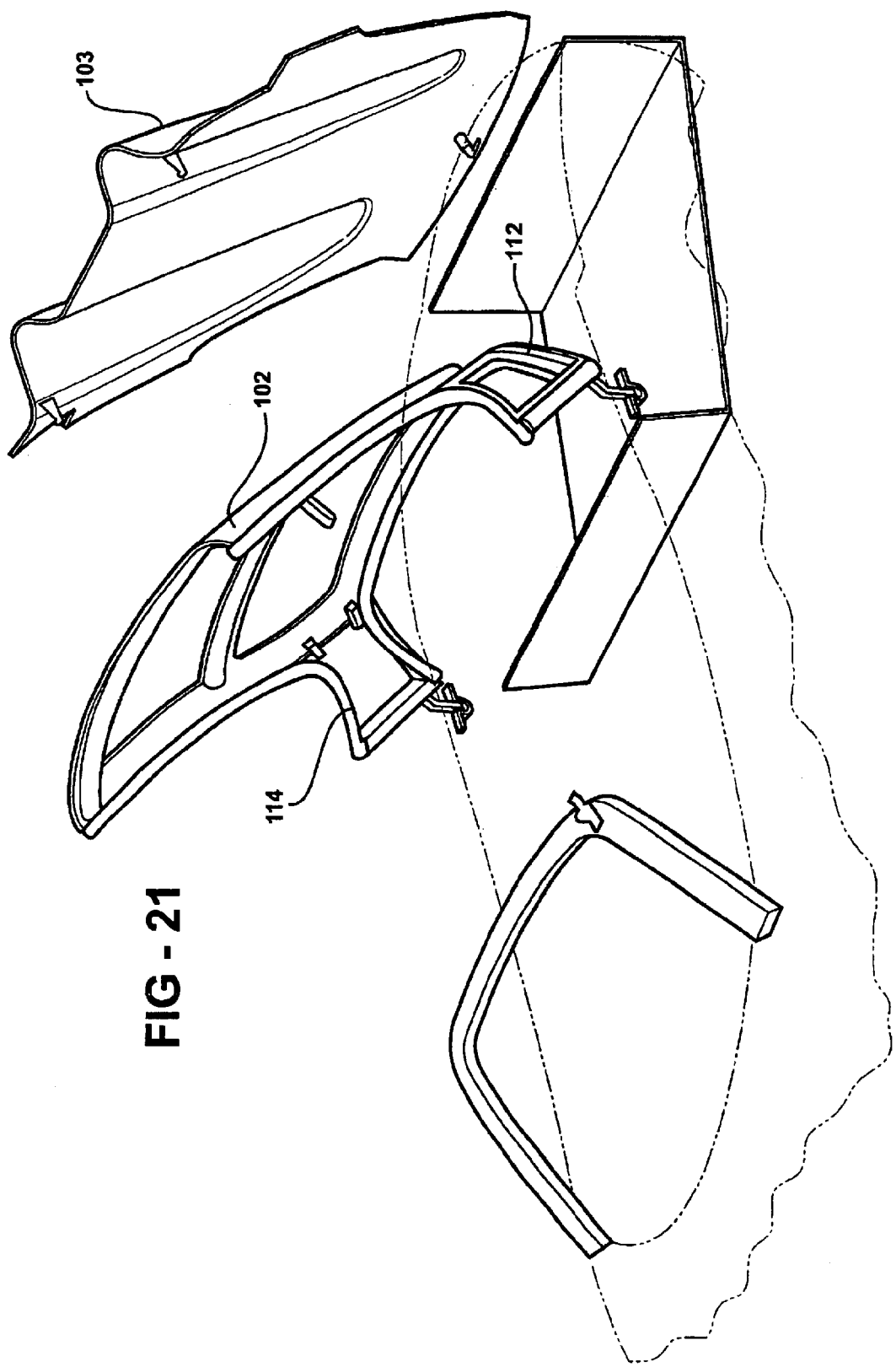
FIG. 21 is a perspective view of the top system of FIG. 19, with the top released from the header and pivoted partially rearwardly.

FIG. 19 shows the support frame 102 in the "extended" position wherein it covers the passenger compartment. Referring now to FIG. 20, a portion of the front bow 106, the windshield header 108 and one of the side members 107 is shown. A latching member 120 extends from the front bow 106 and selectively engages an engagement feature 122 of the header 108. The latching member 120 is operated by a handle or latch control 124 which is positioned on the side member 107. Alternatively, it may be power actuated, though manual actuation is preferred for this embodiment. To retract the roof from over the passenger compartment, the header latch is first disconnected from the header, which reduces the tension on the flexible covering over the roof structure. This preferably provides enough slack to allow the side portions of the fabric covering, which are shaped like fins or flying buttresses, to be detached from the storage area cover or body. Referring to FIG. 21, the support frame 102 is then pivoted rearwardly about pivots at the rear edges of the C-pillars 112 and 114. The rear window, not shown, preferably remains in position.

Figure 22:
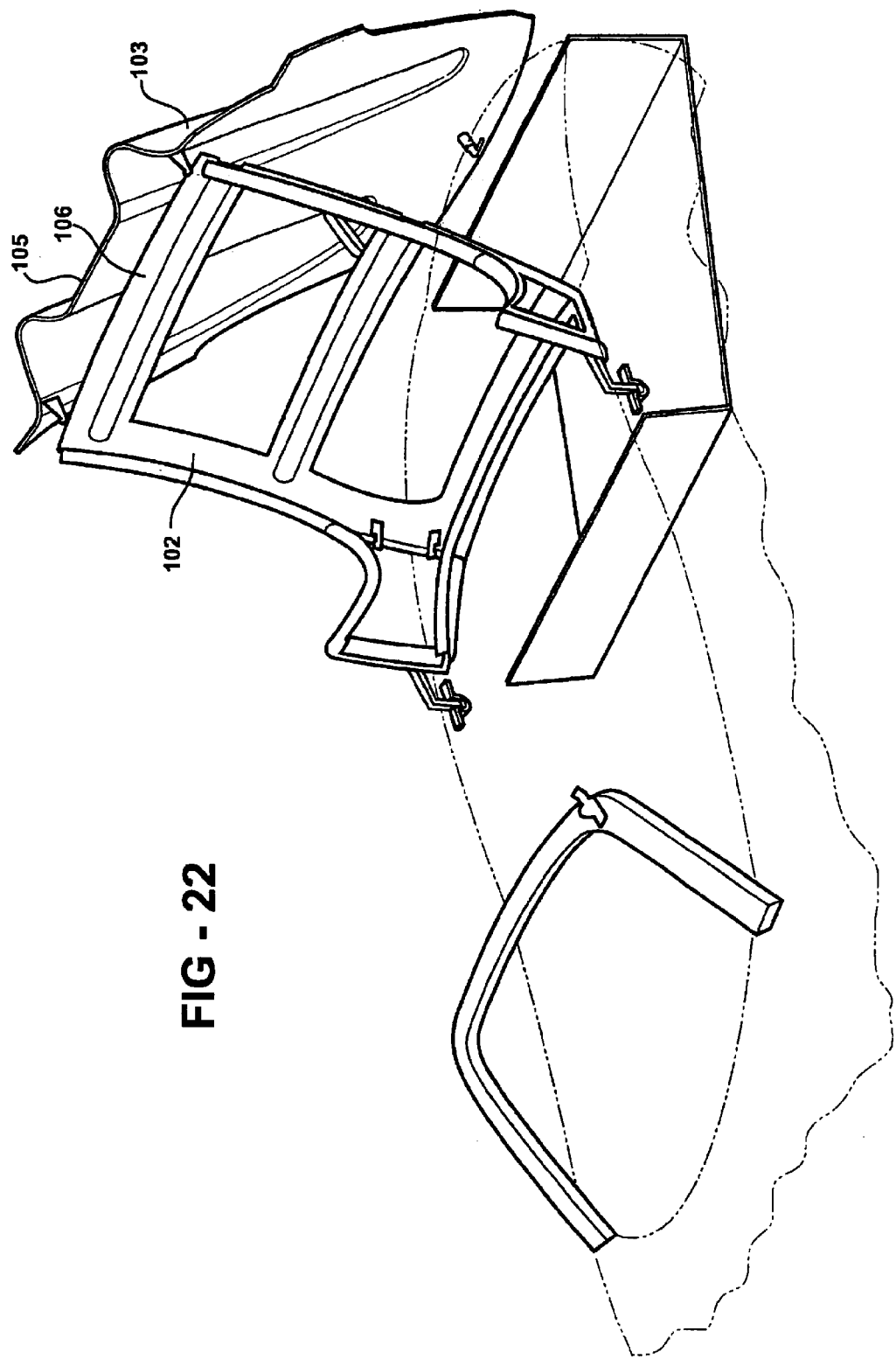
FIG. 22 is a perspective view of the top of FIGS. 19 and 21, with the top rotated farther rearwardly.
Figure 23:
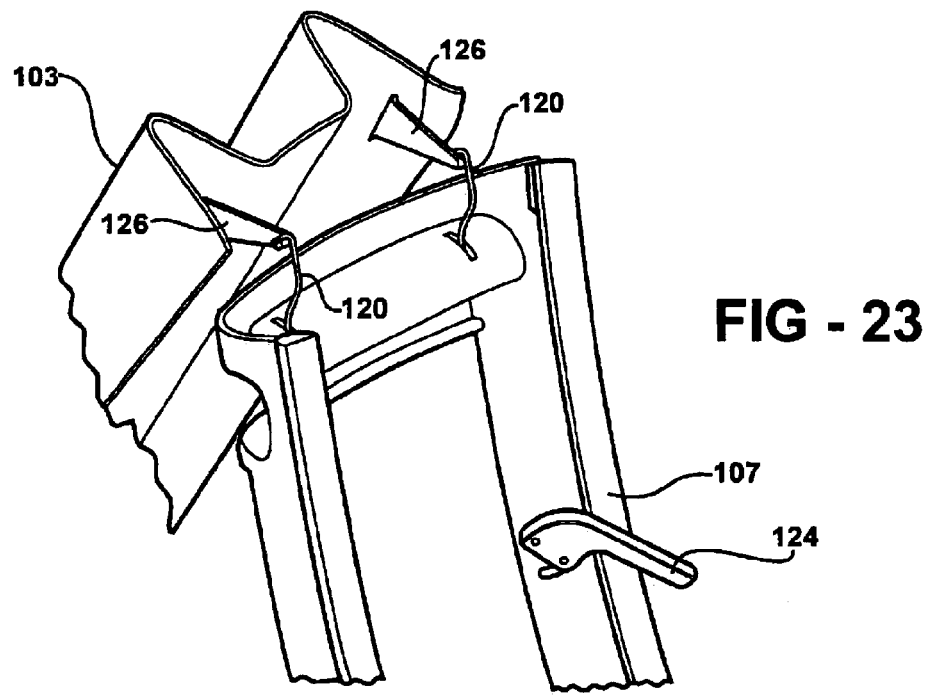
FIG. 23 is a detailed view showing the interconnection of the latching members of the top with engagement features on the underside of the storage area cover.

FIG. 22 illustrates the support frame 102 pivoted further rearwardly to a point where the front bow 106 is adjacent the underside of the storage area cover 103, near its forward edge 105. Referring to both FIGS. 22 and 23, the latching members 120 are then engaged with engagement features 126 on the underside of the storage area cover 104. The handle 124 for operating the latching members 120 is preferably located far enough down the side member 107 that a person standing beside the car can easily grasp it. Preferably, a latching member is provided at each side of the front bow 106, and corresponding engagement features are provided on both sides of the windshield header and on both sides of the storage area cover 103. Handles 124 may also be provided on both sides, with each handle operating one or both latching members.

Figure 24:
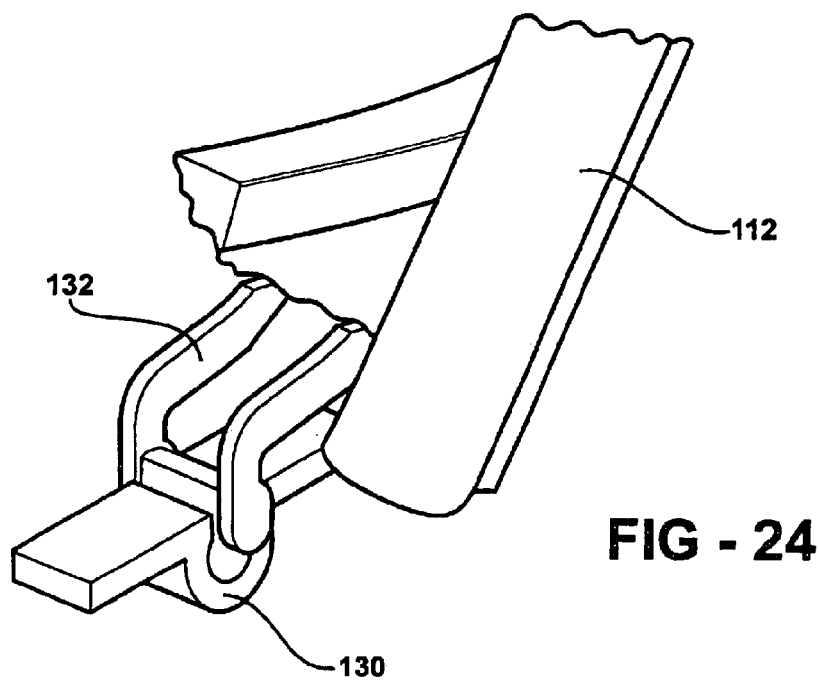
FIG. 24 is a detailed view showing the pivotal and detachable interconnection between the rearward end of the top and the vehicle body, with the top partially detached from the pivot support.
Figure 26:
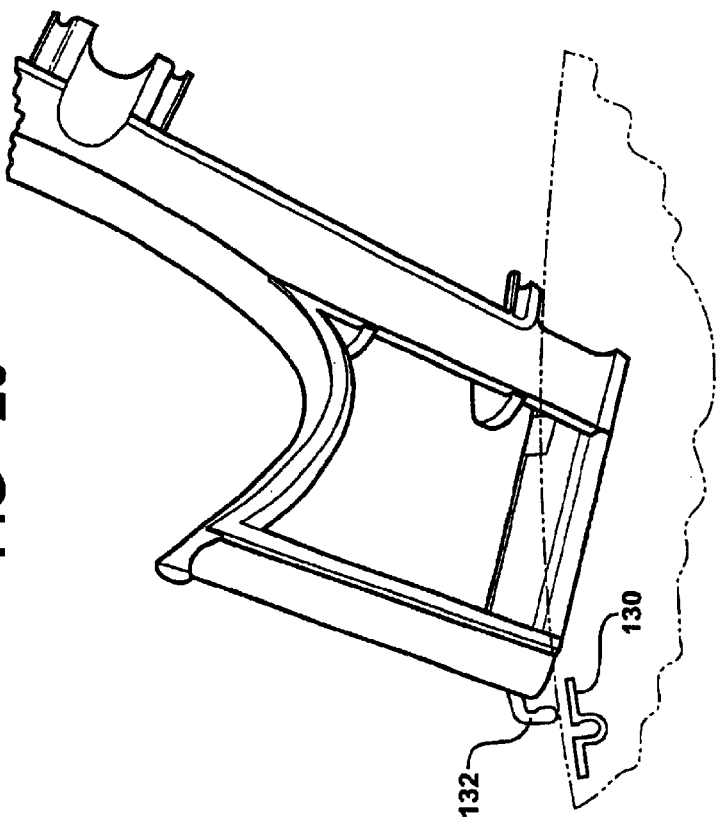
FIG. 26 is a side elevational view similar to FIG. 25 with the pivot being disengaged from the vehicle body.
Figure 25:
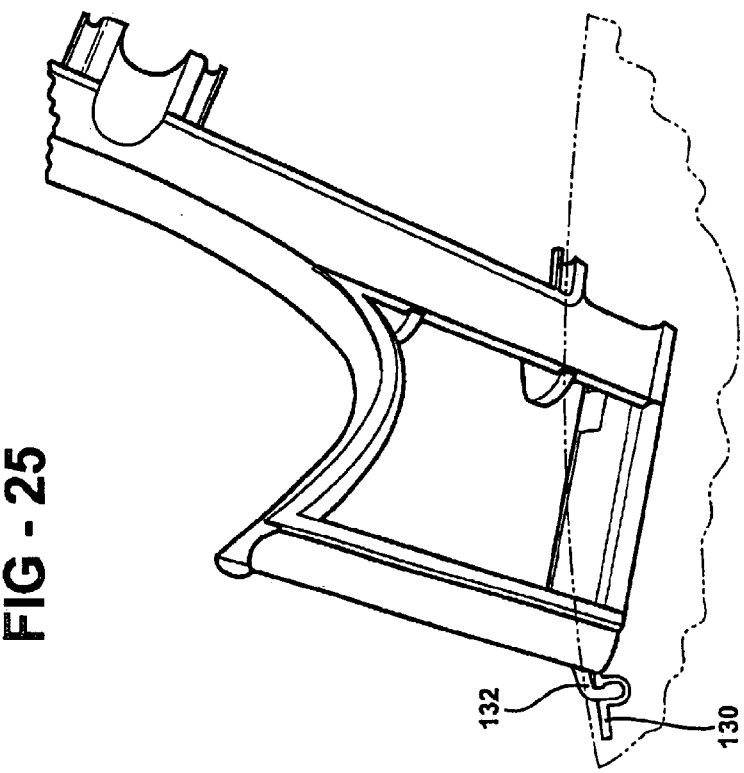
FIG. 25 is a side elevational view of a portion of the top according to the fourth embodiment, with the pivot engaged in the pivot support on the vehicle body.

Turning now to FIG. 24, a detailed view of the pivotal and detachable interconnection between one of the C-pillars 112 and the vehicle body, is shown. A pivotal support 130 is provided on the vehicle body, and a pivot member 132 is received in the pivot support 130. As shown, the pivot support 130 has a generally cylindrical shaped opening for supporting the pivot member 132, and an upward opening for allowing the pivot member 132 to be received or removed from the pivoting area. FIG. 24 shows the pivoting member partially received into the pivot support 130. FIG. 25 shows the pivot member 132 fully received in the pivot support 130, while FIG. 26 shows it removed therefrom. In operation, the support frame 102 is pivoted rearwardly until it is adjacent the underside of the storage area cover and the latching members are engaged with the engagement feature on the underside of the storage area cover. This provides a pivot point between the latching members and the engagement members on the underside of the storage area cover. The engagement of the latching members with the engagement members may lift the top slightly upwardly so as to disengage the pivot members 132 from the pivot supports 130 in the body. Alternatively, the storage area cover 103 may be moved slightly farther rearwardly, to a second open position, thereby lifting the support frame out of the pivot supports 130.

Figure 28:
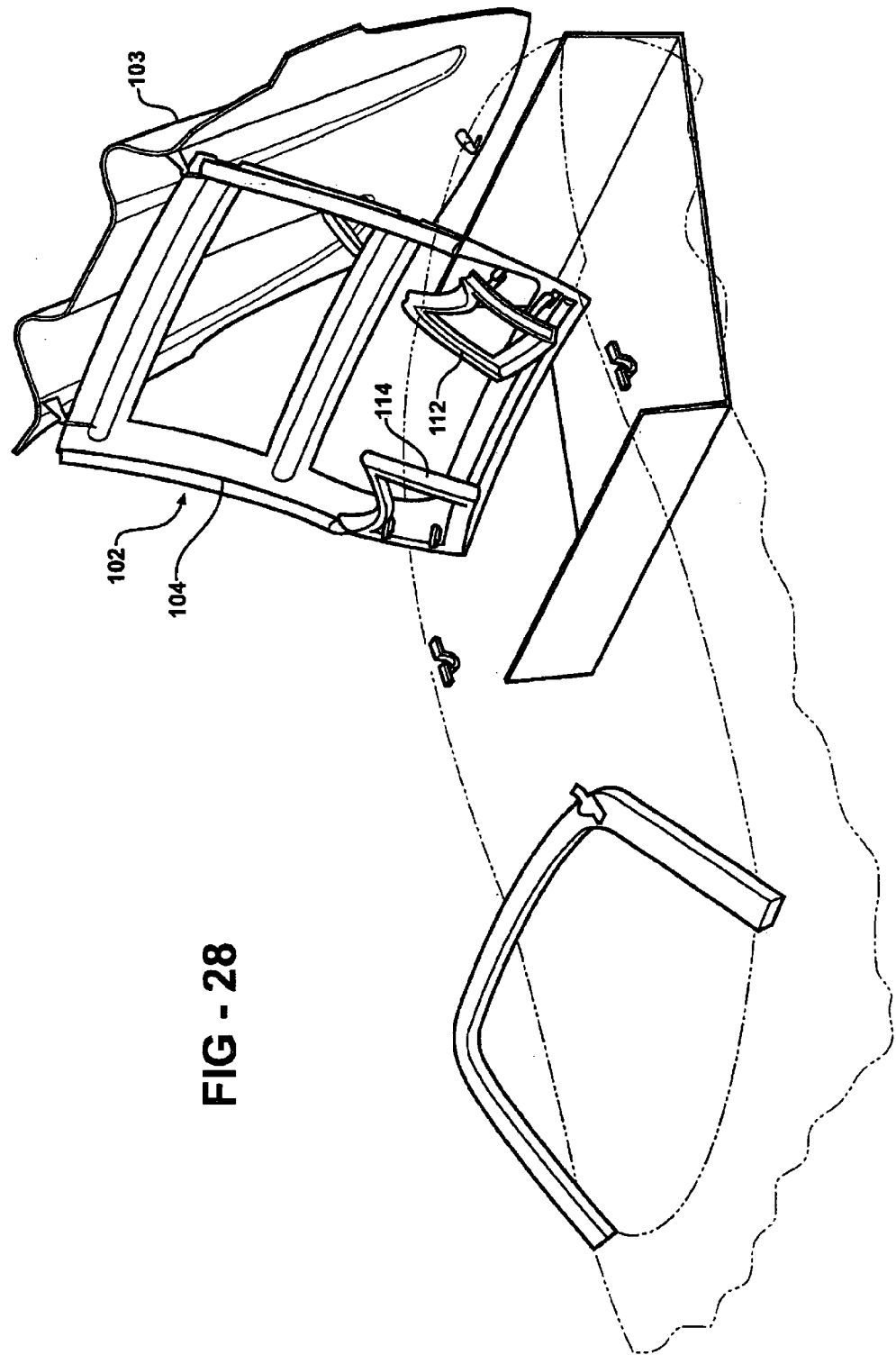
FIG. 28 is a perspective view similar to FIG. 27, with both C-pillars portions folded inwardly.
Figure 30:
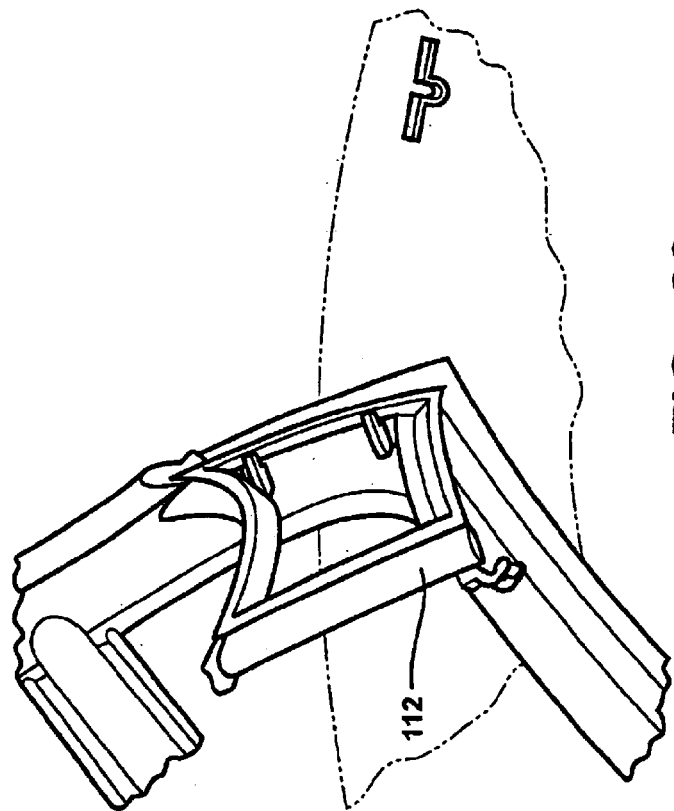
FIG. 30 is another perspective view of a portion of the top showing the C-pillar portion being folded inwardly.
Figure 29:
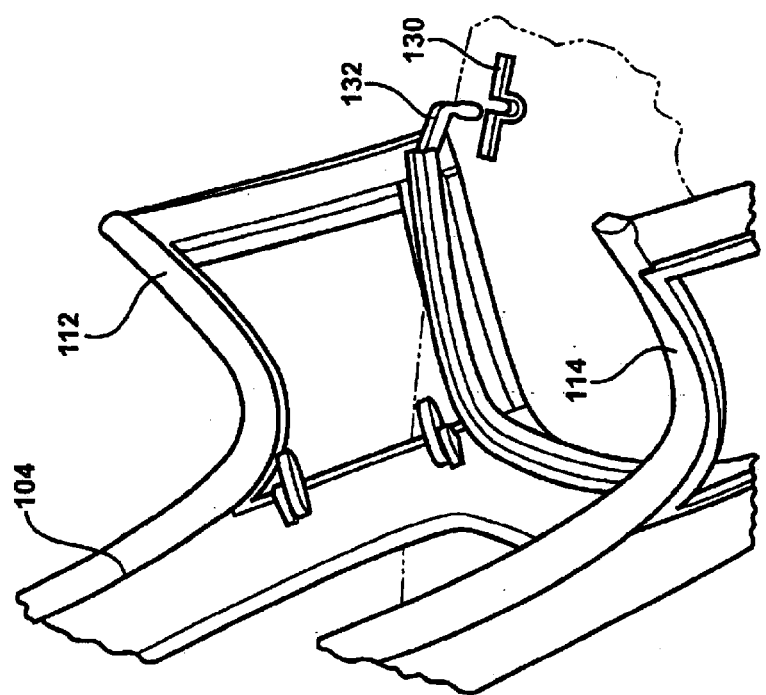
FIG. 29 is a perspective view of a portion of the top according to the fourth embodiment, with the pivot being released from the pivot support on the body.

Referring now to FIGS. 27 and 28, the C-pillar portions 112 and 114 are then folded inwardly against the underside of the central portion 104 of the support frame 102. For this purpose, the C-pillar portions 112 and 114 are pivotally interconnected with the central portion 104, as shown. FIGS.

29 and 30 are other views showing the C-pillar portions being disconnected from the pivotal supports and folded against the central portion.

Figure 31:
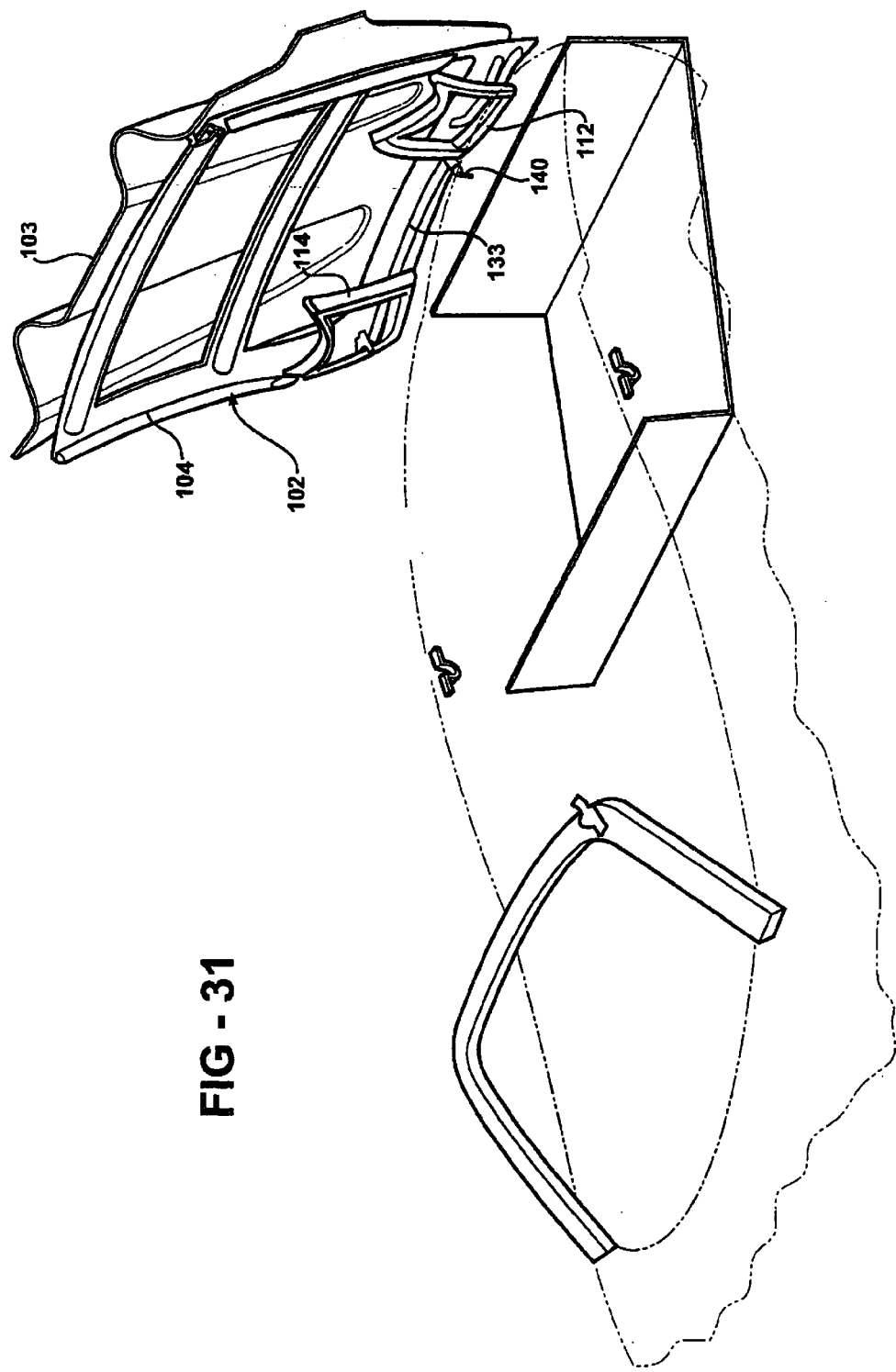
FIG. 31 is a perspective view of the top system according to the fourth embodiment, with the forward end of the top interconnected with the forward end of the cover, and the rearward end of the top swung rearwardly.
Figure 33:
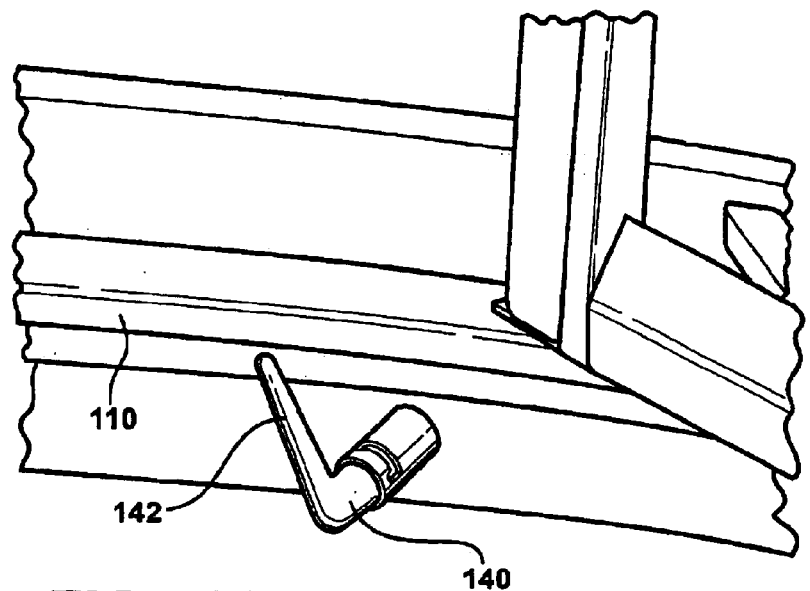
FIG. 33 is a detailed view of a latch control for connecting the folding top to the underside of the cover.

Referring now to FIG. 31, the support frame 102 is shown folded rearwardly such that its rearward edge 133, including the rear bow 110 is against the underside of the storage area cover 103. A latch 140 is shown extending from the underside of the storage area cover 103 near its rear edge. As shown in FIG. 33, the latch 140 is turned such that a retention arm 142 extends under the rear bow 110 of the support frame. This serves to retain the support frame 102 against the underside of the storage area cover 103. The support frame may alternatively be retained adjacent the underside of the cover in a variety of other ways known to those of skill in the art. The latch 140 may be remotely actuated, such as by a control near the side edges, or may be power actuated.

Figure 32:
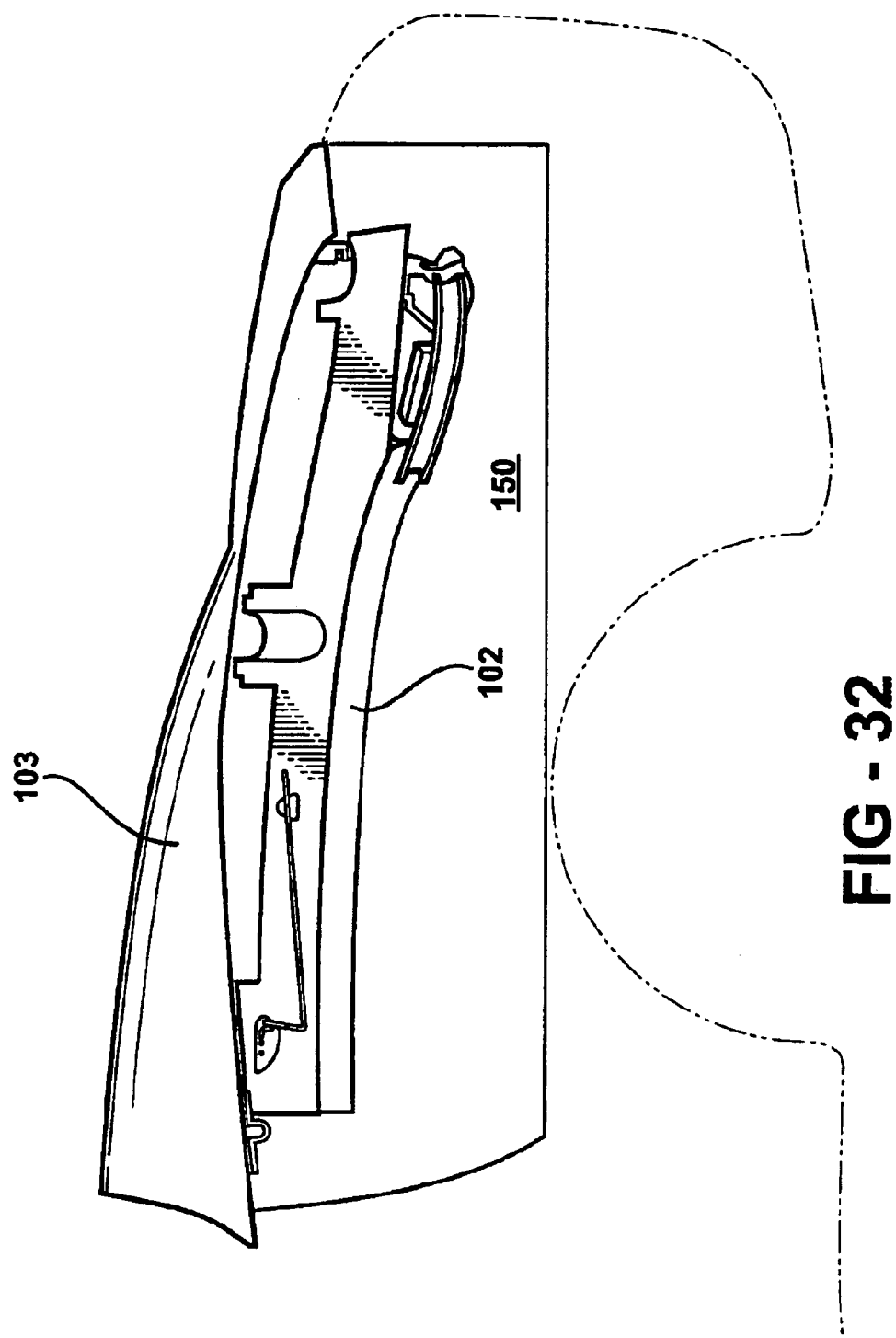
FIG. 32 is a side view of the system of the fourth embodiment, with the top stored underneath the cover and the cover closed.

FIG. 32 shows the storage area cover 103, with the support frame 102 attached to its underside, pivoted downwardly to its horizontal storage position. The rear window may fold, be separately actuated, be removed, or remain in place. After the support frame 102 is disposed on the underside of the storage area cover 104, it can be seen that the storage area 150 is not fully utilized. The storage area cover may be operable to articulate in an opposite direction so as to open like a normal decklid, or access to the storage area may be obtained by again pivoting the storage area cover to the position wherein it received the support frame 102.

Referring now to FIGS. 34–37, a fifth embodiment of the present invention will be described. In the earlier embodiments of the present invention, the top systems preferably include a flexible roof membrane that covers a support frame. It is preferred that the rear-most edge of this membrane extend rearwardly beyond the rear window to form a pair of fins or flying buttresses. In the earlier embodiments, these fins were formed by attaching portions of the membrane to the storage area cover or body rearwardly of the rear window. The fifth embodiment of the present invention provides a different approach for supporting fin portions extending rearwardly of the rear window. This embodiment of the present invention may be combined with other top designs, such as the first three embodiments of this invention.

Referring to FIG. 34, a retractable top system 160 includes a support frame assembly 162 having a forward end 164 and a rearward end 166. This support frame assembly 162 is preferably pivotably interconnected with a vehicle body, such as at pivot 168. In this embodiment, a rear window frame 170 forms part of the rearward end 166 of the support frame assembly 162. A pair of fin supports 172, only one of which is shown in FIG. 34, are pivotably interconnected with the rearward end 166 of the support frame assembly 162. FIG. 34 illustrates the top system 160 in the extended position, wherein the support frame assembly 162 extends over the passenger compartment of the vehicle. A storage area cover 174 covers a storage area to the rear of the passenger compartment and has a forward edge 176 adjacent the rear window 177 and a rearward edge 178 spaced therefrom. With the top system 160 in the extended position, the cover 174 is generally horizontal with the forward edge 176 being adjacent the rear window 177. With the top system 160 in the extended position, the fin supports are also in an extended position, as shown. In this extended position, the fin supports 172 extend rearwardly from the rear window 177 and rear window frame 170 past the forward edge 176 of the storage area cover 174 and adjacent the upper surface of the cover 174. The rear-most portion 180 of the flexible membrane covering the frame assembly 162 attaches to the fin supports, so as to provide the fins or flying buttresses extending rearwardly up the rear window 177.

Figure 37:
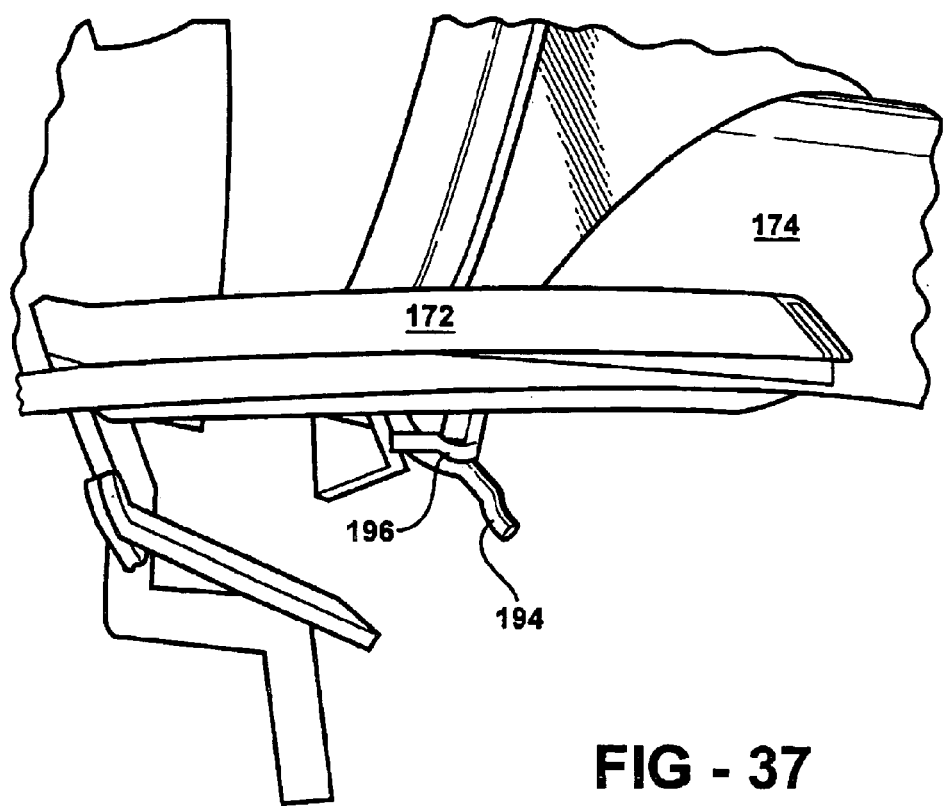
FIG. 37 is a detailed view similar to FIGS. 35 and 36, with the fin support shown in the extended position.
Figure 35:
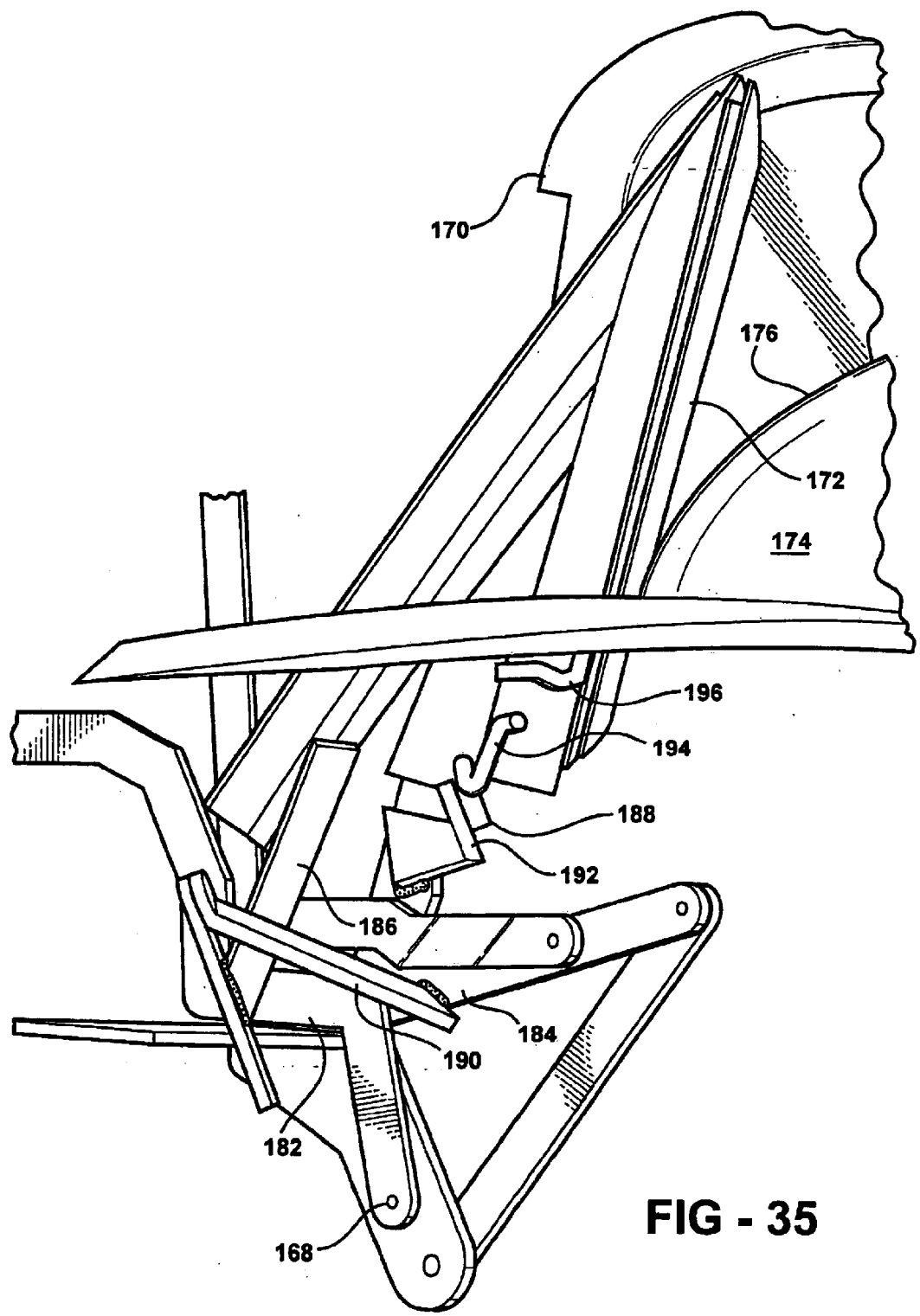
FIG. 35 is a detailed view of a fin support in a partially folded position.
Figure 36:
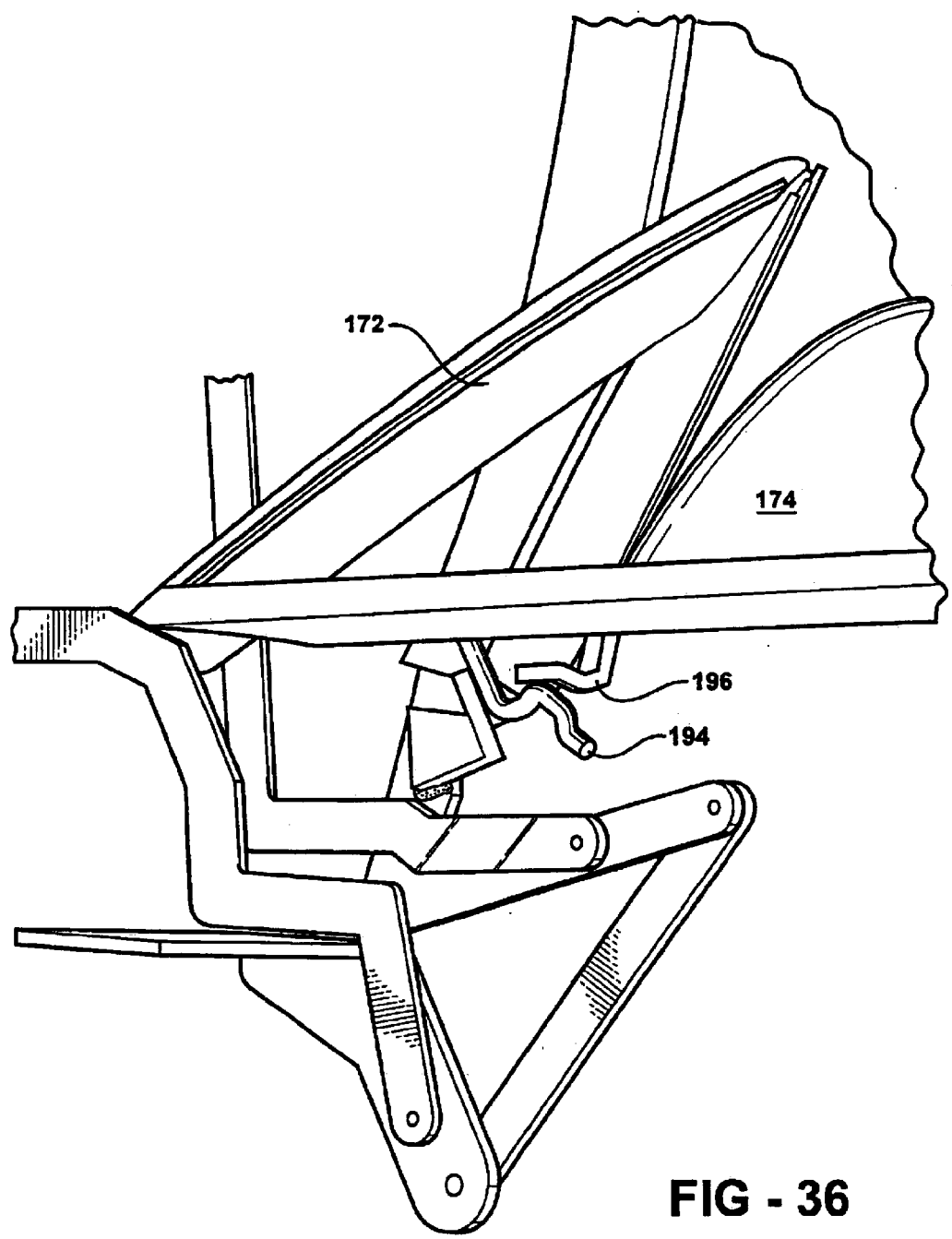
FIG. 36 is a detailed view similar to FIG. 35, with the fin support moved partially towards the extended position.

FIGS. 35–37 show detailed views of one of the fin supports 172 and its interaction with the forward edge 176 of the cover 174. As best shown on these figures, the support frame assembly 162 includes a downwardly and rearwardly extending pivot member 182 that interconnects the support frame assembly 162 with the pivot 168, about which the support frame assembly 162 pivots. The window frame 170 has a downwardly extending portion 184 that interconnects with this pivot member 182. The fin support 172 has pivot brackets 186 and 188 that interconnect the fin support 172 with support brackets 190 and 192, respectively. The support brackets 190 and 192 are interconnected with the downwardly extended portion 184 of the window frame 170 so that the fin support 172 is pivotably interconnected to the window frame. Alternatively, the fin support 172 may be pivotably interconnected with the support frame assembly in other ways.

FIG. 35 shows the fin support 172 in a folded position wherein the fin support is pivoted towards the assembly, in this case the window frame 170. The fin support 172 is preferably spring biased into this position, such as by springs imbedded in the pivotal interconnection supporting the fin support 172. The fin support 172 preferably includes a fin engagement arm 194 that extends therefrom. An engagement feature is provided on cover 174, which in this embodiment is a member 196 interconnected with the underside of the cover 174 adjacent its forward edge 176. FIG. 35 illustrates the system wherein the cover 174 is moving from its open position to its closed position. It is shown in the position where the engagement feature 196 is about to contact the engagement arm 194 as the cover 174 moves downwardly to its closed position. As the cover 174 moves farther downwardly, the engagement feature 196 causes the engagement arm 194 to move downwardly, which pivots the fin support 172 downwardly. FIG. 36 shows the system wherein the cover 174 is moved downward sufficiently that the engagement member 196 is engaged with the engagement arm 194 and the fin support 172 is partially pivoted. FIG. 37 shows the cover 174 fully closed, with the engagement member 196 engaging the engagement arm 194 and having pulled the fin support 172 into its extended position. Some portions of the assembly are left out of FIGS. 36 and 37 for simplicity. When the process is reversed and the cover 174 moves upwardly, the engagement arm 194 is allowed to move upwardly such that the fin support 172 pivots to its folded position due to the spring bias. Alternatively, the fin support may be spring biased in the opposite direction, and then forced open, or may have an over-center design wherein it remains in either an open or a closed position once moved to that position.

Figure 38:
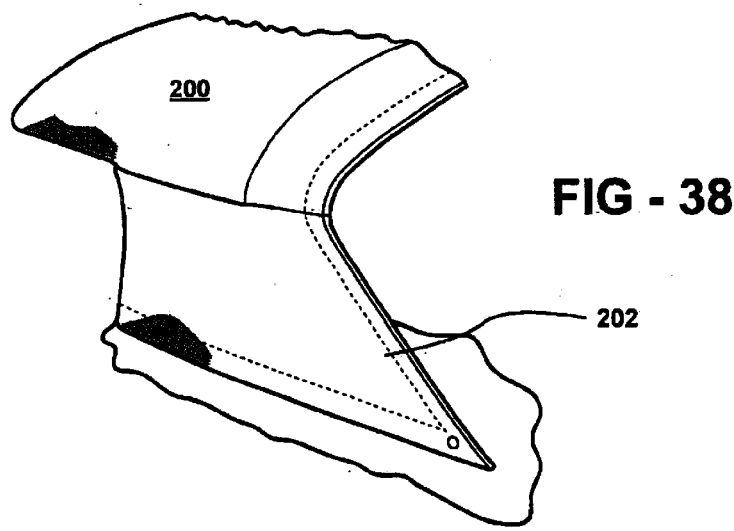
FIG. 38 is a perspective view of a portion of a top system according to the present invention showing a fabric membrane covering a portion of the top frame, with the system in the extended position.
Figure 39:
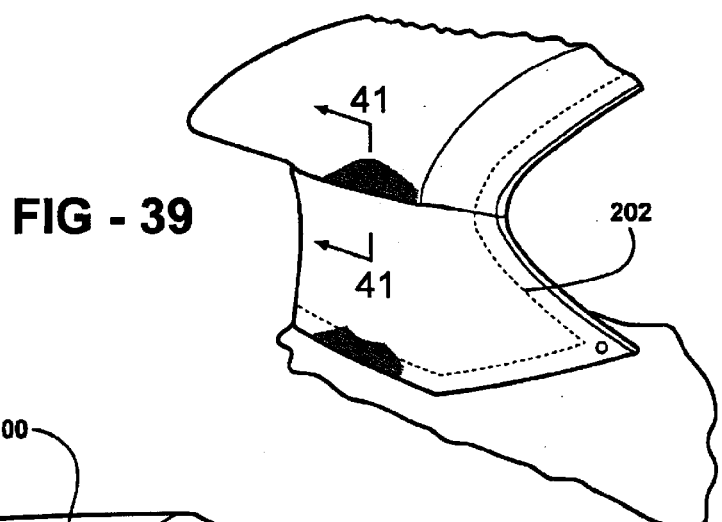
FIG. 39 is a perspective view similar to FIG. 38, with the fin portion of the membrane detached from the cover.
Figure 40:
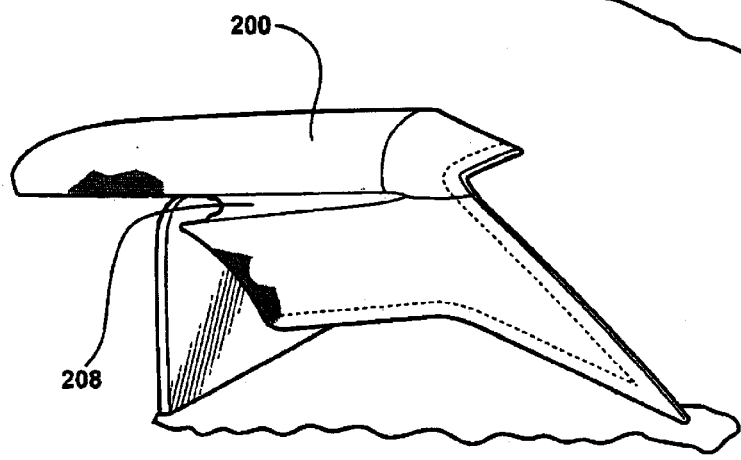
FIG. 40 is a perspective view similar to FIGS. 38 and 39, with the C-pillar portion of the top frame folded towards central portion.
Figure 41:
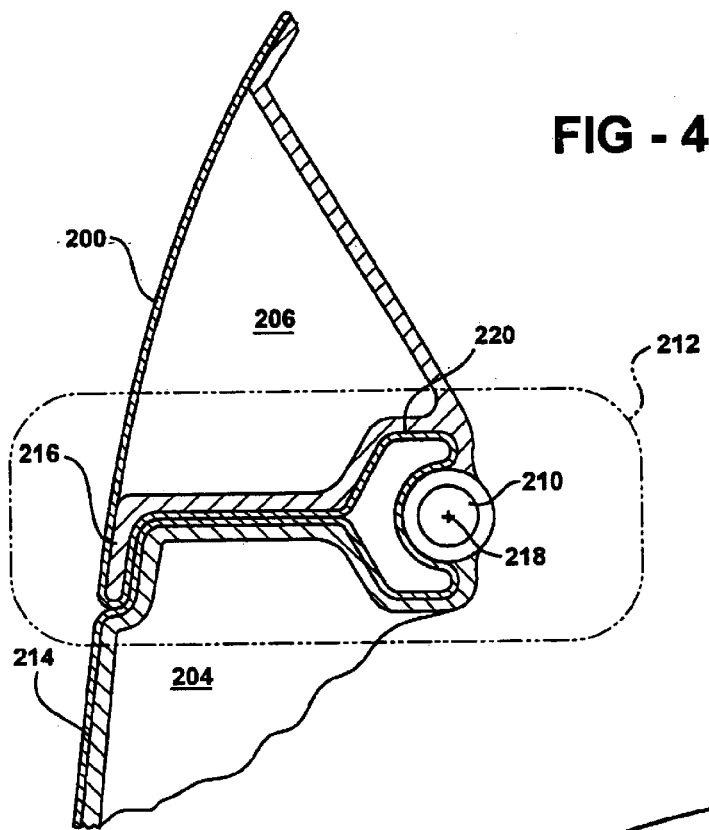
FIG. 41 is a cross-sectional view taken along lines 41–41 of FIG. 39, showing the hinge area.
Figure 42:
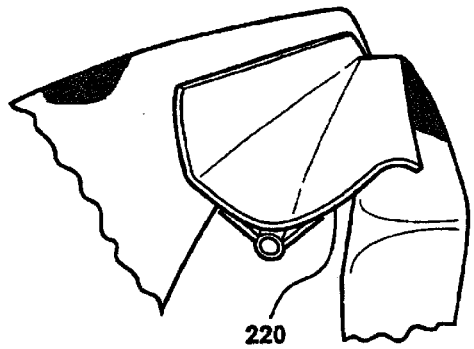
FIG. 42 is a detailed view showing the hinge area of the top system, with the C-pillar portion of the top frame folded against the central portion.
Figure 43:
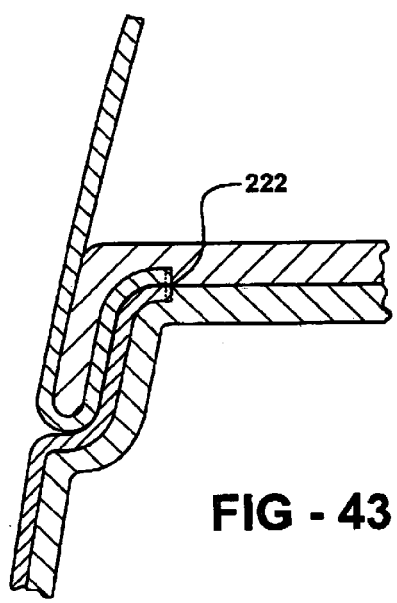
FIG. 43 is a cross-sectional view of an alternative approach to interconnecting the fabric membrane in the hinge area.

Referring now to FIGS. 38–42, another aspect of the present invention will be described. The version of the present invention shown in FIGS. 19–33 includes C-pillar portions that fold against the central portion of the support frame. The support frame is preferably covered with a fabric roof membrane. However, it is necessary to compensate for the fact that the C-pillar portions fold inwardly. FIG. 38 shows a portion of the top system with a flexible roof membrane 200 disposed thereon. The fabric membrane 200 has a portion covering the central portion and also extends downwardly and covers the C-pillar portions. The rearmost portion 202 extends rearwardly, so as to form a fin. In order to move the top system to the storage position, this rear-most portion 202 is detached, as shown in FIG. 39. The C-pillar portion 204 is then folded towards the central portion 206 as shown in FIG. 40. This opens a gap 208 in the membrane 200. It is preferred that the inside of the top system be separated from the outside of the top system by the membrane. Therefore, it is preferred that the gap 208 remain sealed. FIG. 41 shows a cross-section taken along lines 41—41 of FIG. 39. This shows part of one C-pillar portion 204 and part of the central portion 206 joined together by hinge 210. The area where the C-pillar portion 204 and central portion 204 join may be referred to as a hinge region 212. The portion 204 has an outer surface 214 and the central portion 206 has an outer-surface 216, which cooperate to define the outer surface of the top frame. As shown, the hinge 210 is positioned inwardly from the outer surfaces 214 and 216. The hinge axis for the hinge 210 is shown at 218. In order to seal the inner-side of the top system from the outer-side, the membrane 200 includes a pair of pocket portions 220, with one pocket portion extending into each of the hinge regions 212. This pocket portion 220 is also shown in FIG. 42, wherein the C-pillar portion is folded against the central portion. The pocket portion 220 extends from the outer surfaces of the C-pillar portion and central portion in the hinge region and has sufficient additional fabric to allow the hinge 210 to fold. Preferably, the pocket portions 220 are held into the hinge region by an elastic retainer. As will be clear to those of skill in the art, the pocket portions may be formed of a different material than the remainder of the flexible membrane, or may be formed of the same material. FIG. 43 illustrates an alternative approach, wherein the membrane does not extend into defined pocket portions, but instead a seal 222 is provided where the membrane ends. This seal 222 prevents air or water from moving into the hinge region when the C-pillar portions are in the downward position.

As will be clear to those of skill in the art, the various embodiments of the present invention may be altered in various ways without departing from the scope or teaching of the present invention. For example, the various pivots illustrated may be moved to different positions, or may be altered to be more complicated articulated interconnections, rather than the simple pivots that are preferred. Also, while the various embodiments illustrate support frames that are covered by a flexible membrane, various aspects of the present invention may also be applied to hardtop designs. For example, the embodiment of FIGS. 19–32 could be constructed as interconnected hard panels, that articulate in the same manner as discussed with respect to the soft-top design. That is, the design may have a central portion and a pair of C-pillar portions that are each hard panels and do not require the flexible outer covering. Alternatively, only part of the top may be hard panels, while the remainder has a flexible covering. These and other alternatives will be clear to those skilled in the art. It's the following claims, including all equivalents, which define the scope of the present invention.

We claim:

1. A retractable top system for a vehicle having a body with a passenger compartment defined therein, the body further having a storage area defined behind the passenger compartment, the vehicle having a windshield defining the forward end of the passenger compartment with a header at its upper edge, the header including an engagement feature, the top system having an extended position wherein the top system defines a roof over the passenger compartment and interconnects with the windshield header, a storage position wherein the top system does not cover the passenger compartment and at least a portion of the top system is disposed in the storage area, and an intermediate position between the extended and storage positions, the top system comprising:
   a top having a forward end and a rearward end, the rearward end being detachably and pivotally interconnected with the vehicle body adjacent the rear of the passenger compartment, the top including a latching member at the forward end, the latching member operable to selectively engage the engagement feature of the header so as to interconnect the forward end of the top with the header; and
   a cover selectively covering the storage area behind the passenger compartment, the cover having a forward end and a rearward end, the cover having a closed position wherein the cover closes the storage area and an open position wherein the forward end moves upwardly so as to uncover at least a portion of the storage area, the cover having an under side with an engagement feature and a retaining latch defined thereon, the engagement feature being adjacent the forward end and the retaining latch being spaced rearwardly therefrom;
   wherein when the top system is in the extended position, the top extends over the passenger compartment with the rearward end being interconnected with the vehicle body and the latching member being engaged with the engagement feature of the header so that the forward end is interconnected with the header, and when the top system is in the intermediate position, the latching member engages the engagement member on the under side of the cover and the rearward end of the top is retained adjacent the underside of the cover by the retaining latch such that the top is supported by the cover and is movable therewith, the top system being in the storage position when the top is retained adjacent the underside of the cover and the cover is in the closed position.

2. The top system according to claim 1, wherein the top includes a top frame and a flexible membrane covering the top frame when the top system is in the extended position, the top frame including the latching member and the pivotal and detachable interconnection with the vehicle body.

3. The top system according to claim 2, wherein the flexible membrane has a rearward edge that is connected to an upper surface of the cover over the storage area when the top system is in the extended position.

4. The top system according to claim 2, wherein the top frame has a central portion with a forward end and a rearward end, the forward end being interconnected with the windshield header when the top system is in the extended position, the top frame further having a pair of C-pillar portions pivotally interconnected with the central portion, the C-pillar portions extending between the central portion and the vehicle body when the top system is in the extended position and the C-pillar portions folding against the central portion when the top system is in the storage position.

5. The top system according to claim 1, further including a rear window supported on the vehicle body at the rear of the passenger compartment, the rear window being disposed generally vertically when the top system is in the extended position.

6. The top system according to claim 5, wherein the rear window remains stationary when the top system moves from the extended position to the intermediate position.

7. The top system according to claim 5, wherein the top includes a top frame and a flexible membrane covering the top frame when the top system is in the extended position, the top frame including the latching member and the pivotal and detachable interconnection with the vehicle body.

8. The top system according to claim 7, wherein a portion of the flexible membrane extends rearwardly of the rear window so as to define a rearwardly extending fin portion on each side of the rear window when the top system is in the extended position.

9. The top system according to claim 1, wherein the top has an inner surface and an opposed outer surface, the inner surface facing the passenger compartment when the top system is in the extended position and being directed generally downwardly when the top system is in the storage position.

10. The top system according to claim 1, wherein the top has a central portion with a forward end and a rearward end, the forward end being interconnected with the windshield header when the top system is in the extended position, the top further having a pair of C-pillar portions pivotally interconnected with the central portion, the C-pillar portions extending between the central portion and the vehicle body when the top system is in the extended position and the C-pillar portions folding against the central portion when the top system is in the storage position.

11. A retractable top system for a vehicle having a body with a passenger compartment defined therein, the body further having a storage area defined behind the passenger compartment, the vehicle having a windshield defining the forward end of the passenger compartment with a header at its upper edge, the top system having an extended position wherein the top system defines a roof over the passenger compartment and interconnects with the windshield header, a storage position wherein the top system does not cover the passenger compartment and at least a portion of the top system is disposed in the storage area, and an intermediate position between the extended and storage positions, the top system comprising:

a top having a central portion with a forward end and a rearward end, the forward end being interconnected with the windshield header when the top system is in the extended position, the top further having a pair of C-pillar portions pivotally interconnected with the central portion, the C-pillar portions extending between the central portion and the vehicle body when the top system is in the extended position and the C-pillar portions folding against the central portion when the top system is in the storage position.

12. The top system according to claim 11, wherein the top includes a top frame and a flexible membrane covering the top frame when the top system is in the extended position, the top frame including the latching member and the pivotal and detachable interconnection with the vehicle body.

13. The top system according to claim 12, wherein the central portion and the C-pillar portions each have an outer surface with the outer surfaces cooperating to define the outer surface of the top frame, the central portion and the C-pillar portions each interconnecting at a hinge region with the pivotal interconnection being a hinge having a hinge axis that is offset inwardly from the outer surface of the central portion and the C-pillar portion, the flexible membrane covering the outer surfaces of the central portion and the C-pillar portions and having a pair of pocket portions each extending into one of the hinge regions, the pocket portions being configured such that when the C-pillar portions extend between the central portion and the body the pocket portions are disposed in the hinge region inboard of the outer surfaces and when the C-pillar portions are folded against the central region the pocket portions continuously cover the hinge region.

14. The top system according to claim 11, further including a rear window supported on the vehicle body at the rear of the passenger compartment, the rear window being disposed generally vertically when the top system is in the extended position.

15. The top system according to claim 14, wherein the rear window remains stationary when the top system moves from the extended position to the intermediate position.

16. The top system according to claim 11, wherein the top has an inner surface and an opposed outer surface, the inner surface facing the passenger compartment when the top system is in the extended position and being directed generally downwardly when the top system is in the storage position.

17. A method of moving a top system for a vehicle from an extended position wherein the top system defines a roof over a passenger compartment of the vehicle to a storage position wherein the top system does not cover the passenger compartment, the method comprising the steps of:

providing a top having a forward end and a rearward end, the rearward end being detachably and pivotally interconnected with the vehicle body adjacent the rear of the passenger compartment, the forward end being detachably interconnected with a windshield header at the forward end of the passenger compartment;

providing a cover for selectively covering a storage area to the rear of the passenger compartment in the vehicle, the cover having a forward end and a rearward end, the cover having a closed position wherein the cover closes the storage area and an open position wherein the forward end moves upwardly so as to uncover at least a portion of the storage area;

moving the cover from the closed position to the open position;

detaching the forward end of the top from the windshield header;

pivoting the top such that the forward end moves upwardly and rearwardly from the windshield header;

pivotally interconnecting the forward end of the top with the underside of the cover adjacent the forward end of the cover;

detaching the rearward end of the top from the vehicle body;

rotating the top about the forward end such that the rearward end of the top moves rearward until the top is adjacent the underside of the cover;

retaining the top adjacent the underside of the cover;

moving the cover to the closed position such that the top is disposed in the storage area.

18. The method according to claim 17, wherein the top has a central portion with a forward end and a rearward end, the forward end being interconnected with the windshield header when the top system is in the extended position, the top further having a pair of C-pillar portions pivotally interconnected with the central portion, the C-pillar portions extending between the central portion and the vehicle body when the top system is in the extended position, the method further comprising the step of folding the C-pillar portions against the central portion prior to moving the cover to the closed position.

19. The method according to claim 17, wherein the cover has a first open position and a second open position with the forward end of the cover being farther upward when cover is in the second open position than when the cover is in the first open position, the step of moving the cover from the closed position to the open position comprising moving the cover to the first open position, the method further comprising the step of moving the cover from the first open position to the second open position after the forward end of the top is pivotally interconnected with the underside of the cover, such that the top is lifted upwardly to perform the detaching step.

* * * * *